United States Patent
Wang et al.

(10) Patent No.: US 12,508,907 B2
(45) Date of Patent: Dec. 30, 2025

(54) METHOD AND APPARATUS FOR DISPLAYING WINDOW, MEDIUM AND IN-VEHICLE INFOTAINMENT TERMINAL

(71) Applicant: Xiaomi EV Technology Co., Ltd., Beijing (CN)

(72) Inventors: Ying Wang, Beijing (CN); Kai Yu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/818,940

(22) Filed: Aug. 29, 2024

(65) Prior Publication Data

US 2025/0214429 A1    Jul. 3, 2025

(30) Foreign Application Priority Data

Dec. 28, 2023   (CN) .......................... 202311839656.8

(51) Int. Cl.
| | | |
|---|---|---|
| *G06F 3/01* | (2006.01) | |
| *B60K 35/00* | (2024.01) | |
| *B60K 35/22* | (2024.01) | |
| *G06F 3/14* | (2006.01) | |
| *G06F 3/16* | (2006.01) | |
| *H04L 67/125* | (2022.01) | |

(52) U.S. Cl.
CPC ........... *B60K 35/22* (2024.01); *G06F 3/1454* (2013.01); *H04L 67/125* (2013.01); *B60K 2360/164* (2024.01); *B60K 2360/577* (2024.01)

(58) Field of Classification Search
CPC .................................................... B60R 16/023
See application file for complete search history.

(56) References Cited

U.S. PATENT DOCUMENTS

| | | | | |
|---|---|---|---|---|
| 2010/0192085 A1* | 7/2010 | Yamazaki | ............. | G06F 3/0481 |
| | | | | 715/773 |
| 2015/0352953 A1* | 12/2015 | Koravadi | ............... | B60K 35/00 |
| | | | | 701/36 |
| 2023/0221798 A1* | 7/2023 | Kim | ....................... | B60N 2/933 |
| | | | | 345/156 |
| 2023/0336654 A1 | 10/2023 | Xu | | |
| 2023/0342106 A1* | 10/2023 | Ji | ........................... | G06F 9/451 |

FOREIGN PATENT DOCUMENTS

| | | | |
|---|---|---|---|
| CN | 109165075 | A | 1/2019 |
| CN | 113613072 | A | 11/2021 |
| CN | 113805748 | A | 12/2021 |
| CN | 114327199 | A | 4/2022 |
| CN | 115048067 | A | 9/2022 |
| CN | 115857855 | A | 3/2023 |

* cited by examiner

*Primary Examiner* — Nan-Ying Yang
(74) *Attorney, Agent, or Firm* — Volpe Koenig

(57) ABSTRACT

A method for displaying a window, performed by an in-vehicle infotainment terminal. The method includes: determining an existence condition of a vacant window position in a driving interface in response to receiving a window addition instruction for a target window, where the target window is configured to display an application interface of a mobile terminal application or a mirror image of a mobile terminal; and adding the target window to the driving interface according to the existence condition.

20 Claims, 13 Drawing Sheets

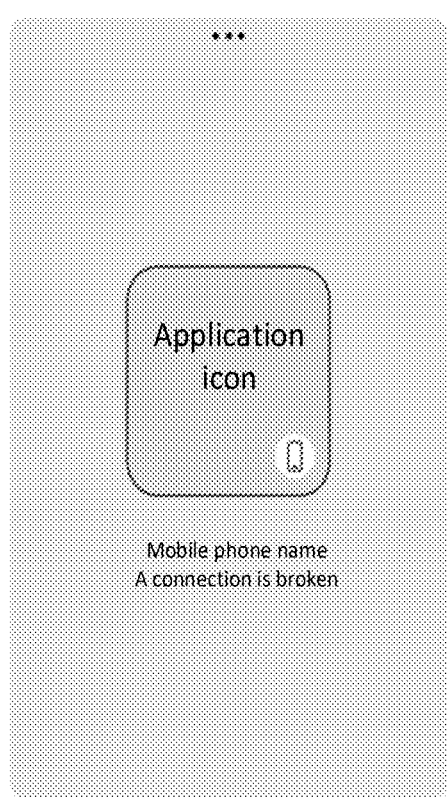
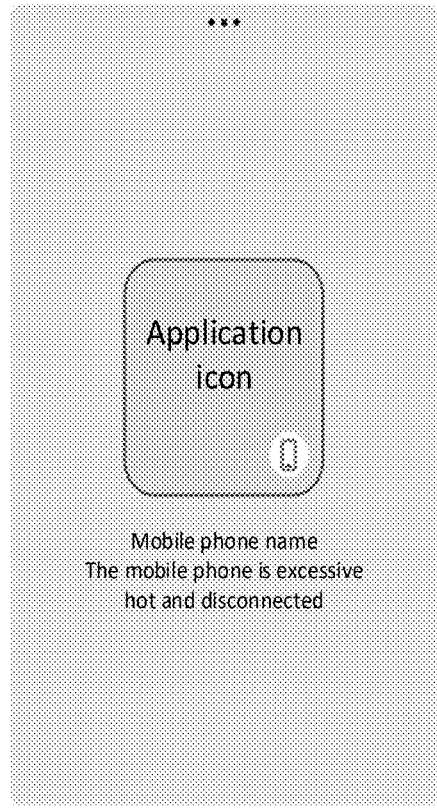
Fig. 9A　　　　　　　　　　　　　Fig. 9B
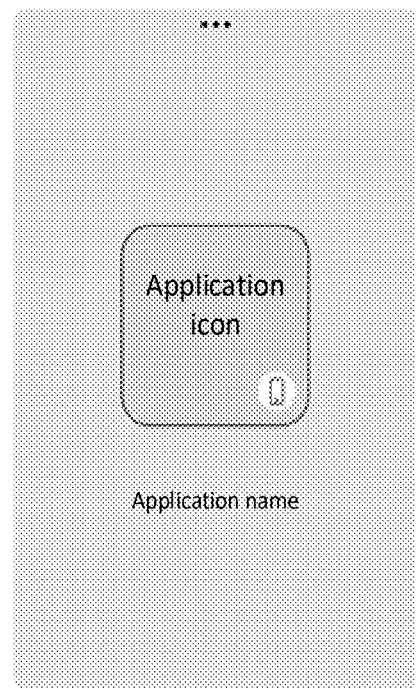
Fig. 10

METHOD AND APPARATUS FOR DISPLAYING WINDOW, MEDIUM AND IN-VEHICLE INFOTAINMENT TERMINAL

CROSS REFERENCE TO RELATED APPLICATIONS

The application is based on and claims priority to the Chinese Patent Application No. 202311839656.8, filed on Dec. 28, 2023, the entire contents of which are incorporated herein by reference.

BACKGROUND OF THE INVENTION

As the interconnection technology for a mobile terminal and an in-vehicle infotainment terminal advances, a user can project a picture of a mobile terminal onto the in-vehicle infotainment terminal. Especially, applications running on the mobile terminal, such as navigation applications, music applications and video applications, can be projected onto the in-vehicle infotainment terminal.

SUMMARY OF THE INVENTION

In order to solve the problems in the related art, the disclosure provides a method and apparatus for displaying a window, a medium and an in-vehicle infotainment terminal.

According to a first aspect of an example of the disclosure, a method for displaying a window is provided. The method is performed by an in-vehicle infotainment terminal. A driving interface of the in-vehicle infotainment terminal includes n application windows, and n≥1. In a case of n>1, the n application windows are transversely arranged adjacent to each other.

The method includes: determining an existence condition of a vacant window position in the driving interface in response to receiving a window addition instruction for a target window, where the target window is configured to display an application interface of a mobile terminal application or a mirror image of a mobile terminal; and adding the target window to the driving interface according to the existence condition.

A window queue is configured for the n application windows to be continuously arranged adjacent to each other. A state of the window queue is dynamically updated as a window layout of the driving interface changes. Serial numbers of the application windows in the window queue increase in sequence in a direction opposite to a starting point direction. A serial number of an application window, closest to the starting point direction, of the n application windows is 1. The starting point direction is a direction, close to a driver side, of the in-vehicle infotainment terminal.

At least part of a region of the window queue overlaps the driving interface, so as to ensure that the application windows in the window queue are displayed in the driving interface.

According to a second aspect of an example of the disclosure, a non-transitory computer-readable storage medium is provided. The non-transitory computer-readable storage medium stores a computer program instruction. The program instruction when executed by a processor, causes the processor to implement steps of the method for displaying a window provided in the first aspect of the disclosure.

According to a third aspect of an example of the disclosure, an in-vehicle infotainment terminal is provided. The in-vehicle infotainment terminal includes: a processor; and a memory configured to store a processor-executable instruction. The processor is configured to execute the executable instruction in the memory, so as to implement steps of the method for displaying a window provided in the first aspect of the disclosure.

It should be understood that the general descriptions and the following detailed descriptions are only illustrative and explanatory, and cannot limit the disclosure.

BRIEF DESCRIPTION OF DRAWINGS

The accompanying drawings here are incorporated into the description as a constituent part of the description, illustrate examples conforming to the disclosure, and serve to explain principles of the disclosure along with the description.

FIG. 9A is a schematic diagram of a display state of a target application in a case that an in-vehicle infotainment terminal is not connected to a mobile terminal according to an example.

FIG. 9B is a schematic diagram of a display state of a mobile terminal application in a case that an in-vehicle infotainment terminal is not connected to a mobile terminal according to another example.

FIG. 10 is a schematic diagram of a display state in a case that a mobile terminal application fails to be started according to an example.

DETAILED DESCRIPTION OF THE INVENTION

Examples will be described in detail here and shown in accompanying drawings illustratively. When the following descriptions involve accompanying drawings, unless otherwise specified, the same numeral in different accompanying drawings denotes the same or similar elements. The embodiments described in the following examples do not denote all embodiments consistent with the disclosure. On the contrary, the embodiments are merely instances of apparatuses and methods consistent with some aspects of the disclosure as detailed in the appended claims.

It should be noted that all actions to acquire signals, information or data in the disclosure are carried out under the premise of complying with corresponding data protection laws and policies of a country where an apparatus is located and obtaining authorization from the owner of the corresponding apparatus.

The projected picture of the mobile terminal is displayed by the in-vehicle infotainment terminal in a full-screen display manner. In this way, use of applications at the in-vehicle infotainment terminal will be affected, and user experience is poor. As for this, the disclosure related to the technical field of vehicles, provides a method and apparatus for displaying a window, a medium and an in-vehicle infotainment terminal.

Figure 1:
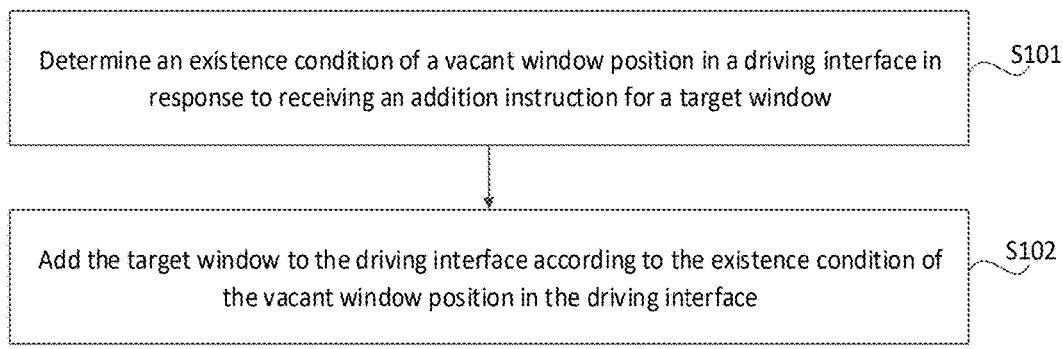
FIG. 1 is a flow diagram of a method for displaying a window according to an example.

FIG. 1 is a flow diagram of a method for displaying a window according to an example. The method may be performed by an in-vehicle infotainment terminal (specifically a vehicle-mounted display device). As shown in FIG. 1, the method for displaying a window may include steps S101 and S102.

S101, an existence condition of a vacant window position in the driving interface is determined in response to receiving an addition instruction for a target window.

In the disclosure, the driving interface of the in-vehicle infotainment terminal includes n application windows. In a case of n>1, that is, in a case that the driving interface includes multiple n application windows, the n application windows are transversely arranged adjacent to each other. That is, no gap is reserved between the n application windows. Thus, in a case that a vacant window position exists at the driving interface, the application windows are arranged preferentially close to the starting point direction in the driving interface. Moreover, the application windows do not cross screens, and different application windows are configured to display different applications.

The target window is configured to display an application interface of a mobile terminal application or a mirror image of the mobile terminal. The mobile terminal application may be, for instance, a navigation application, a music application and a video application. The mobile terminal may be, for instance, a smart phone and a tablet computer. The existence condition of the vacant window position in the driving interface is configured to represent whether a vacant window position exits in the driving interface.

Figure 2A:
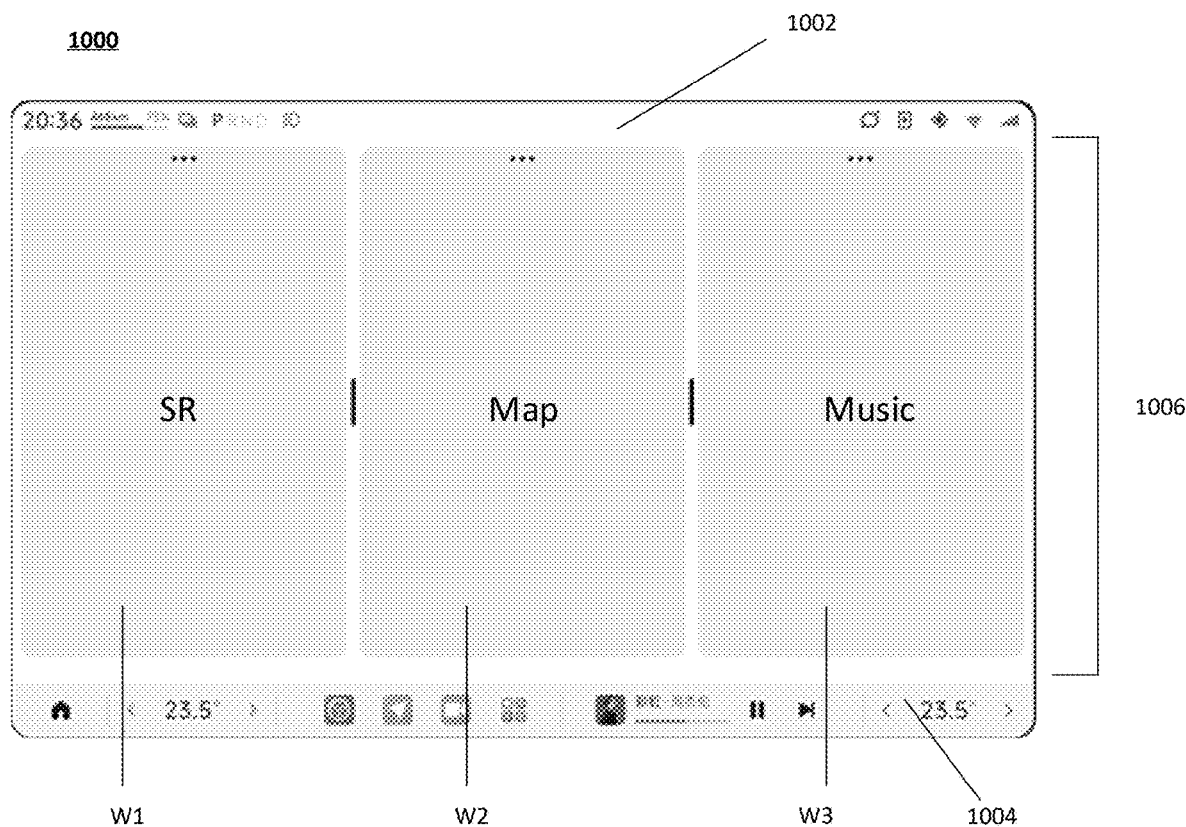
FIG. 2A is a schematic diagram of a driving interface according to an example.

As shown in FIG. 2A, the driving interface 1000 at the in-vehicle infotainment terminal includes three application windows (referred to as window 1 (W1), window 2 (W2), and window 3 (W3) in sequence from left to right) transversely arranged adjacent to each other. Window 1 is configured to display substitutional reality (SR), window 2 is configured to display a map, window 3 is configured to display music, and SR is virtual road condition information of a current position of the vehicle.

In addition, as shown in FIG. 2A, the driving interface 1000 includes a state bar 1002 located at a top of the interface, an application start bar 1004 located at a bottom of the interface, and an effective region 1006 located between the state bar 1002 and the application start bar 1004. The effective region 1006 is configured to display the application windows.

Returning to FIG. 1, in S102, the target window is added to the driving interface according to the existence condition of the vacant window position in the driving interface.

In the disclosure, the window queue is configured for the n application windows in the driving interface to be continuously arranged adjacent to each other. At least part of a region of the window queue overlaps the driving interface, so as to ensure that the application windows in the window queue are displayed in the driving interface. That is, the driving interface is configured to display the application windows in the window queue, and the n application windows are continuous in the window queue.

In addition, a state of the window queue is dynamically updated as a layout of the application window changes. The state of the window queue includes a length (that is, n) of the window queue and a width of the window. That is, adjustment of the layout of the driving interface may cause a change in the length of the window queue and a change with the width of the application window in the window queue. Serial numbers of the application windows in the window queue increase in sequence in a direction opposite to a starting point direction. A serial number of an application window, closest to the starting point direction, of the n application windows is 1. The starting point direction is a direction of the in-vehicle infotainment terminal close to a driver side. In a case that the vehicle is a left-hand drive vehicle, the starting point direction is a horizontal leftward direction. In a case that the vehicle is a right-hand drive vehicle, the starting point direction is a horizontal rightward direction. A vehicle as a left-hand drive vehicle is taken as an instance in the figures of the disclosure.

The technical solutions provided by examples of the disclosure can include beneficial effects as follows: after receiving the window addition instruction for the mobile terminal application or the mirror image of the mobile terminal, the in-vehicle infotainment terminal adaptively adjusts the window layout of the driving interface according to the existence condition of the vacant window position in the driving interface and the number of the application windows in the driving interface such that the application interface of the mobile terminal application or the mirror image of the mobile terminal can be added to the driving interface, and the content of the in-vehicle infotainment terminal and the mobile terminal application can be simultaneously displayed at the in-vehicle infotainment terminal. The display content of the driving interface can be richer, an in-vehicle infotainment terminal application and the mobile terminal are simultaneously operated in the driving interface by a user conveniently, and use experience can be improved.

In the disclosure, a number of the application windows in the driving interface is less than or equal to 3, that is, n≤3. A width of the application window is d/3 or 2d/3, that is, the window queue and the application windows in the driving interface have two sizes of d/3 and 2d/3. The width of the application window is adaptively changed as the layout of the driving interface changes, and d is the width of the driving interface.

Figure 3A:
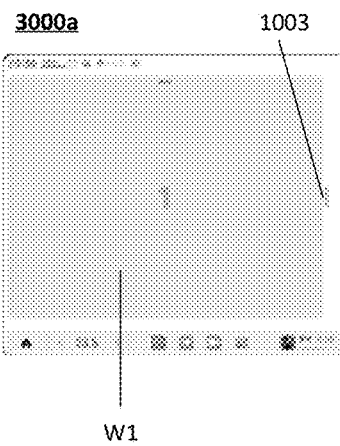
FIG. 3A is a schematic diagram of a driving interface according to yet another example.
Figure 3B:
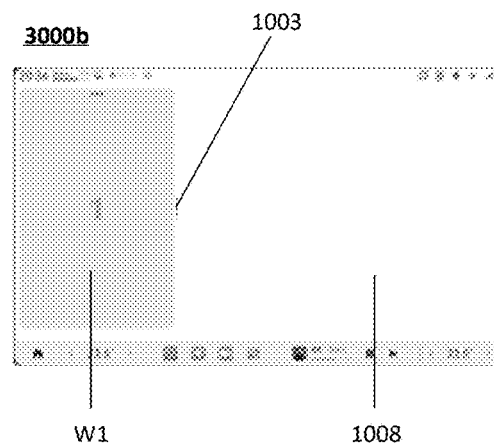
FIG. 3B is a schematic diagram of a driving interface according to yet another example.

In an embodiment, the driving interface includes an application window. The width of the application window W1 may be 2d/3 (as shown in FIG. 3A) or d/3 (as shown in FIG. 3B). In this case, a vacant window position 1008 far away from the starting point direction exists in the driving interface. The width of the vacant window position 1008 is (d−d1), and d1 is the width of the above-mentioned application window.

Figure 4A:
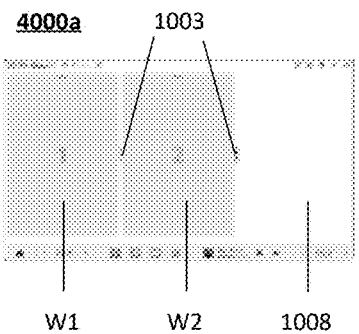
FIG. 4A is a schematic diagram of a driving interface according to yet another example.

In another embodiment, the driving interface includes two application windows W1 and W2. Widths of the two application windows may each be d/3 (as shown in FIG. 4A). In this case, a vacant window position 1008 far away from the starting point direction exists in the driving interface. The width of the vacant window position 1008 is d/3.

Figure 4B:
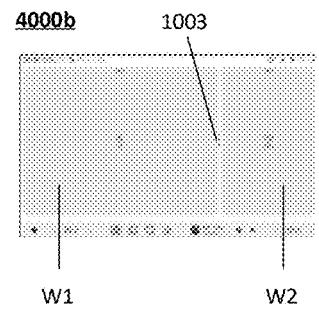
FIG. 4B is a schematic diagram of a driving interface according to yet another example.
Figure 4C:
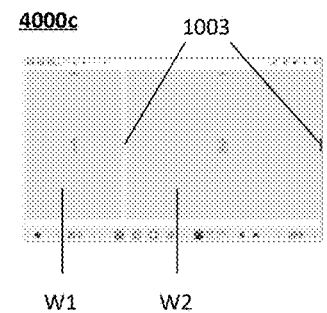
FIG. 4C is a schematic diagram of a driving interface according to yet another example.

In yet another embodiment, the driving interface includes two application windows W1 and W2. Widths of the two application windows are d/3 and 2d/3 respectively. No vacant window position exists in the driving interface. The application window with the width of 2d/3 is close to the starting point direction (as shown in FIG. 4B), or may be far away from the starting point direction (as shown in FIG. 4C).

In another embodiment, as shown in FIG. 2A, the driving interface 1000 includes three application windows W1, W2, and W3. Widths of the three application windows are all d/3. In this case, no vacant window position exists in the driving interface.

Figure 2B:
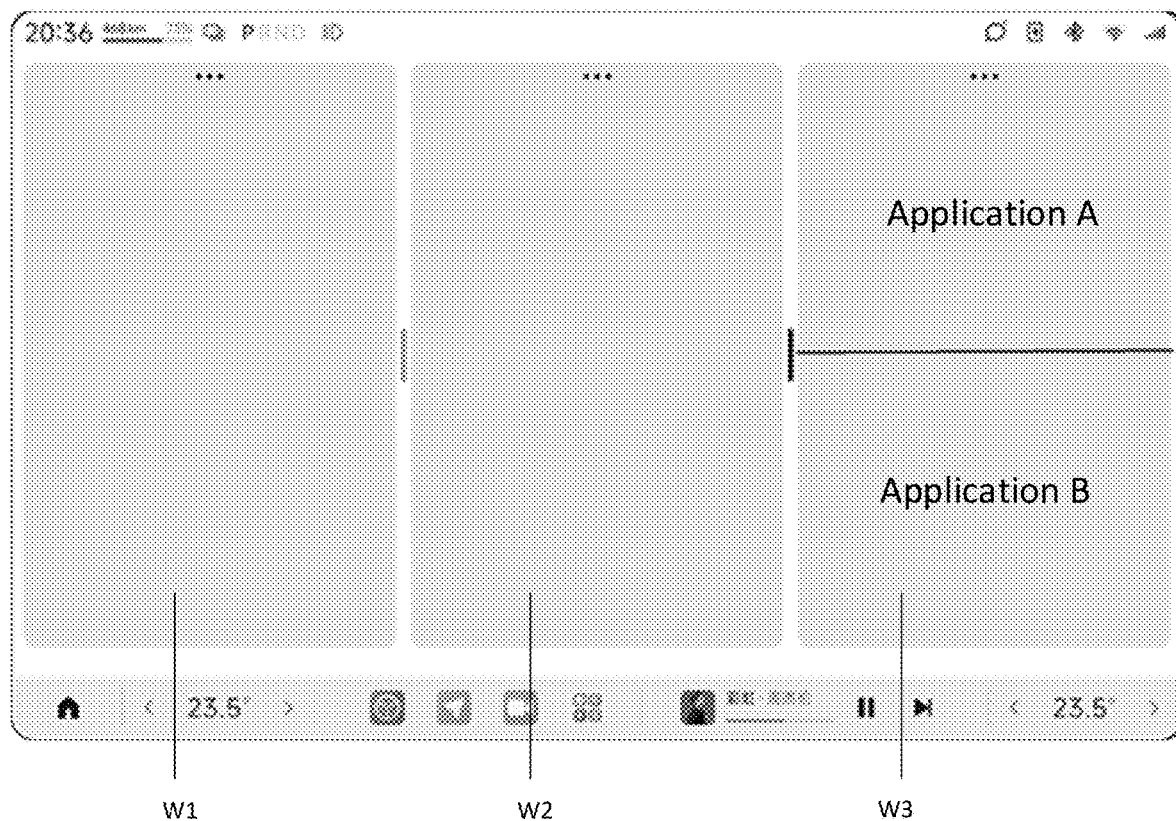
FIG. 2B is a schematic diagram of a driving interface according to another example.

In yet another embodiment, as shown in FIG. 2B, the driving interface 1000 includes n application windows in total. An nth application window Wn of the driving interface includes two or more different application interfaces. In this case, no vacant window position exists in the driving interface.

The embodiment of adding the target window to the driving interface according to the existence condition of the vacant window position in the driving interface in S102 will be described in detail.

In an embodiment, in a case that a vacant window position exists in the driving interface, the width of the target window is adjusted according to a width of the vacant window position and a width of the target window, and the target window is added to the vacant window position.

Specifically, in a case that the width of the target window is less than or equal to the width of the vacant window position, the target window is added to the vacant window position according to the original width. In a case that the width of the target window is greater than the width of the vacant window position, the width of the target window is reduced to the width of the vacant window position, and the target window is added to the vacant window position.

In another embodiment where n=1, the width of the application window is d/3 or 2d/3, and the width of the target window is d/3 by default. In this case, according to the existence condition of the vacant window position in the driving interface, the target window may be added to the driving interface through a method as follows: the target window is added to the vacant window position adjacent to the application window of the original driving interface, where n+1 is executed.

For instance, as shown in FIG. 3A, the driving interface 3000a includes window 1 W1 and a vacant window position 1008. The width of window 1 W1 is 2d/3. In this case, after the target window is added to window 1 W1, the driving interface 4000b shown in FIG. 4B is obtained, and the vacant window position no longer exists. Here, window 2 W2 is the target window.

For instance, as shown in FIG. 3B, the driving interface 3000b includes window 1 W1 and a vacant window position 1008. The width of window 1 W1 is d/3. In this case, after the target window is added to window 1 W1, the driving interface 4000a shown in FIG. 4A is obtained, and window 2 W2 is the target window. That is, the driving interface 4000a shown in FIG. 4A includes window 1 W1, window 2 W2, and vacant window position 1008.

In yet another embodiment, where n=1, and the widths of n application windows each are d. In this case, according to the existence condition of the vacant window position in the driving interface, the target window may be added to the driving interface through a method as follows: the width of the application window in the driving interface is adjusted to 2d/3, 1 is added to n, and the target window with a width of d/3 as an nth application window of the driving interface is added to the driving interface.

In yet another embodiment, n=2, and the widths of the n application windows each are d/3 or 2d/3. In this case, according to the existence condition of the vacant window position in the driving interface, the target window may be added to the driving interface through a method as follows: in a case that no vacant window position exists in the driving interface, a width of an application window with a width of 2d/3 in the driving interface is reduced to d/3, 1 is added to n, and the target window with a width of d/3 as an nth application window of the driving interface is added to the driving interface; and in a case that a vacant window position exists in the driving interface, the target window is added to the vacant window position of the original driving interface.

In the disclosure, in cases that the driving interface includes two application windows and the widths of the two application windows are d/3 and 2d/3 respectively, the width of the application window with the width of 2d/3 in the driving interface is reduced to d/3. No matter how large the target window is, the target window with the width of d/3 is added to the nth application window of the driving interface.

Figure 5:
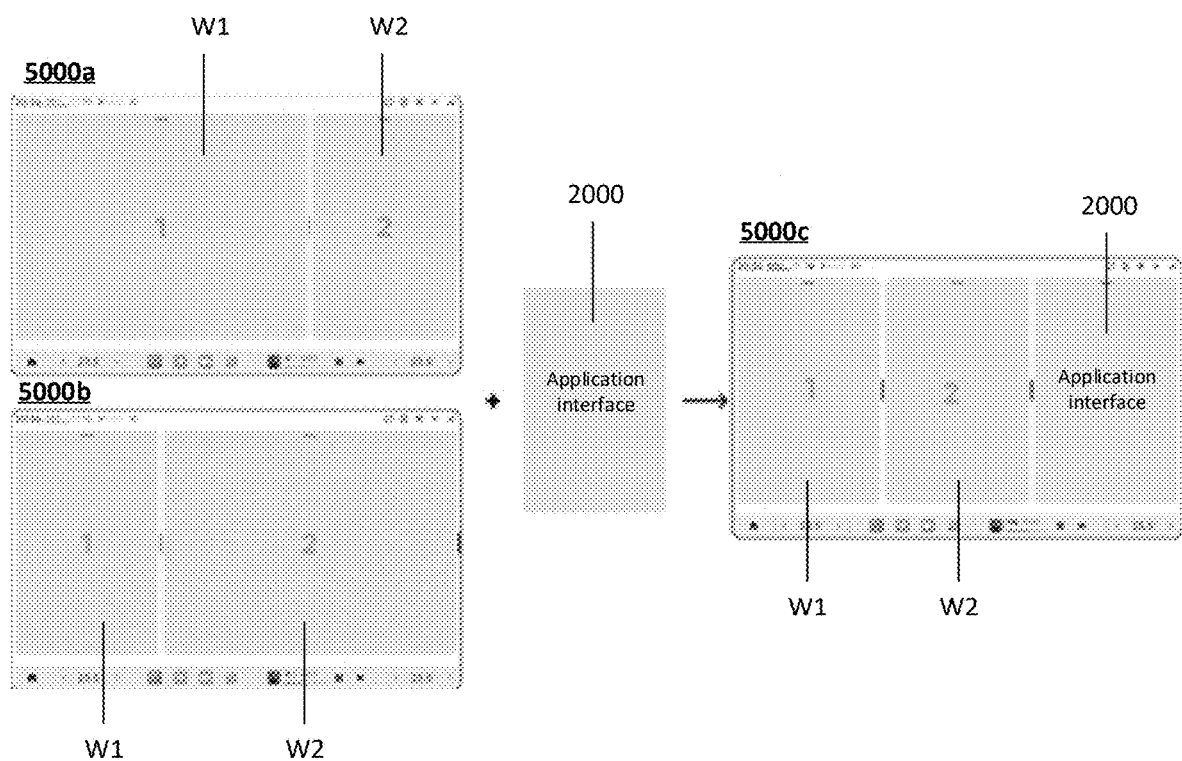
FIG. 5 is a schematic diagram of adding a target window to a driving interface according to an example.

For instance, as shown in an upper left corner of FIG. 5, the driving interface 5000a includes window 1 W1 and window 2 W2. The width of window 1 W1 is 2d/3, and the width of window 2 W2 is d/3. The target window is configured to display the application interface 2000 of the mobile terminal. In this case, the width of window 1 W1 can be reduced to d/3, and after the target window with the width of d/3 is added, the driving interface 5000c on a right side of FIG. 5 is obtained.

For another instance, as shown in a lower left corner of FIG. 5, the driving interface 5000b includes window 1 W1 and window 2 W2. The width of window 1 W1 is d/3, and the width of window 2 W2 is 2d/3. The target window is configured to display the application interface 2000 of the mobile terminal. In this case, the width of window 2 W2 can be reduced to d/3. After the target window with the width of d/3 is added, the driving interface 5000c on the right side of FIG. 5 is obtained.

In cases that the driving interface includes two application windows and widths of the two application windows are both d/3, a vacant window position exists on the driving interface. Then, no matter how large the target window is, the target window with the width of d/3 is added to the vacant window position of the original driving interface.

In yet another embodiment, n=3, and the widths of n application windows are all d/3. In this case, according to the existence condition of the vacant window position in the driving interface, the target window may be added to the driving interface through a method as follows: the target window with the width of d/3 is added to a position at which an nth application window in the driving interface is located, where the original nth application window in the driving interface is pushed to a display interface subsequent to the driving interface.

In the disclosure, in cases that the driving interface includes three application windows and the widths of the three application windows are all d/3, no vacant window position exists in the driving interface. In this case, no matter how large the target window is, the target window with the width of d/3 is added to a position at which an nth application window in the driving interface is located, where the original nth application window in the driving interface is pushed to a display interface subsequent to the driving interface.

The application windows in the window queue constitute a plurality of continuous display interfaces. The previous display interface is an interface, close to the starting point direction, of adjacent interfaces of the driving interface. The display interface subsequent to the driving interface is an interface, far away from the starting point direction, of the adjacent interfaces of the driving interface.

Figure 6:
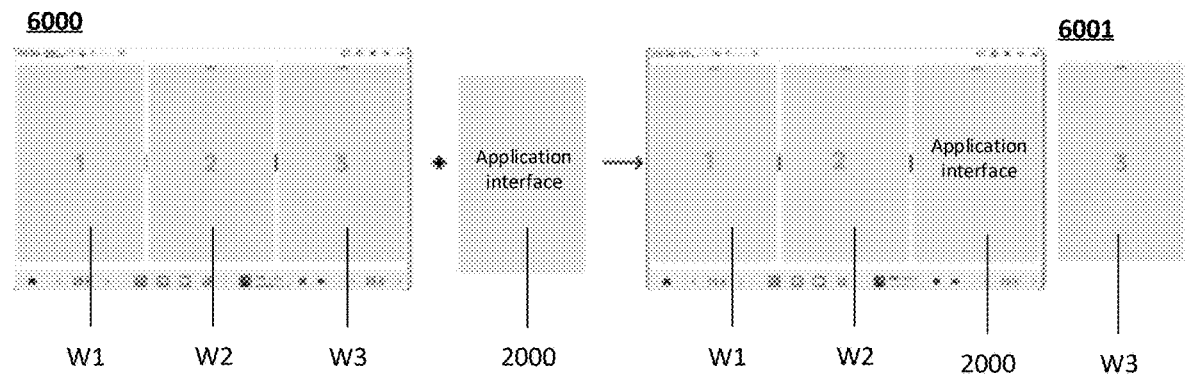
FIG. 6 is a schematic diagram of adding a target window to a driving interface according to another example.

For instance, as shown in FIG. 6, the driving interface 6000 includes window 1 W1, window 2 W2, and window 3 W3. Widths of the three windows are all d/3. The target window is configured to display the application interface 2000 of the mobile terminal. In this case, no matter how large the target window is, the target window with the width of d/3 is added to the position where window 3 is located. In this case, window 3 W3 is pushed out of the driving interface 6000 and pushed to the display interface 6001 subsequent to the driving interface 6000.

In addition, the user can add the target window to the driving interface through a corresponding control at the mobile terminal interface or the driving interface, or add the application interface of the mobile terminal application to the driving interface in a startup interface of the mobile terminal application.

In an embodiment, the user adds the target window to the driving interface through a corresponding control on the driving interface. Specifically, the above-mentioned method may further include two steps as follows: a suspension selection control is generated in response to detecting that the mobile terminal application or the mirror image of the mobile terminal is suspended above the driving interface in a portrait state; and in response to receiving a trigger operation for the suspension selection control, it is determined that the window addition instruction is received.

Figure 7:
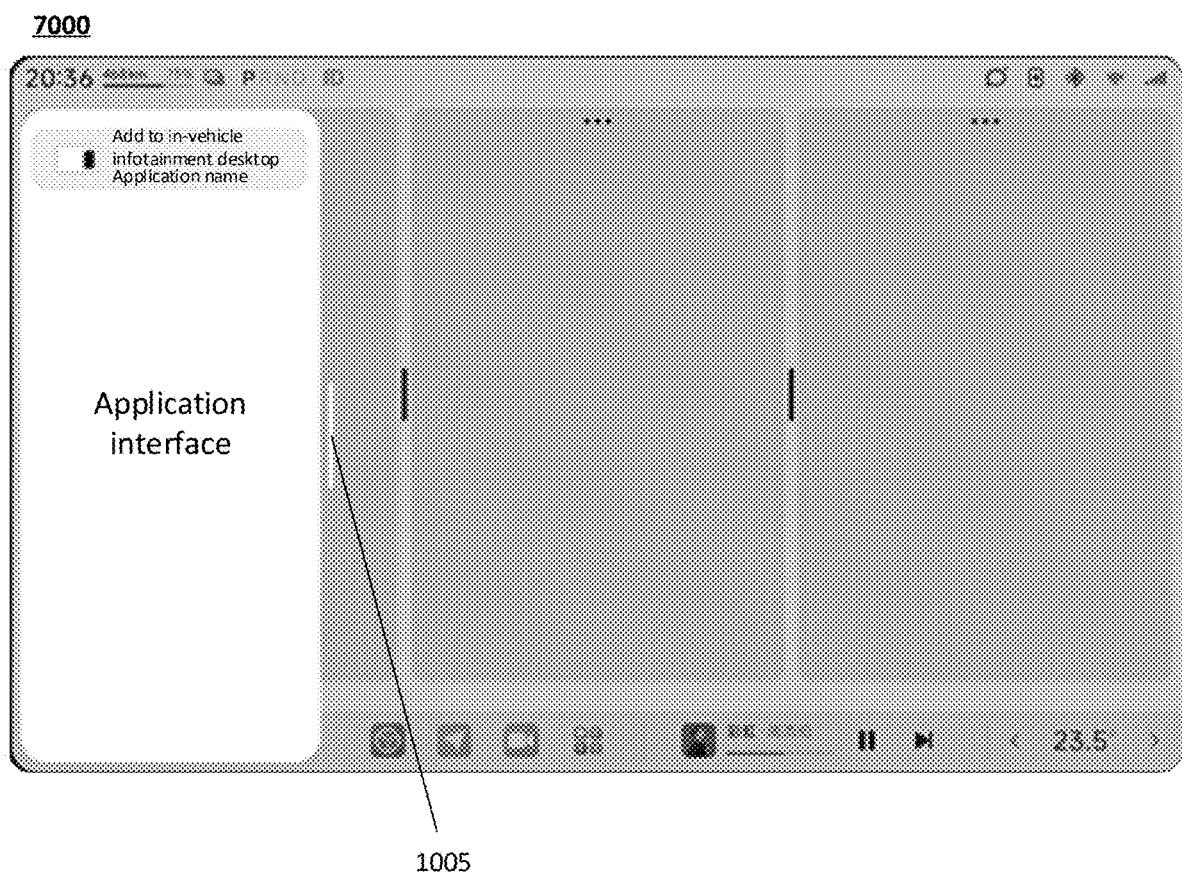
FIG. 7 is a schematic diagram of a suspension selection control according to an example.

In the disclosure, the suspension selection control is configured to indicate whether to add the target window to the driving interface. The mobile terminal may project an application picture of the mobile terminal application to the in-vehicle infotainment terminal in a mirror-image projection manner. The projected image of the application interface of the mobile terminal application on the in-vehicle infotainment terminal is referred to as a mirror image. The mobile terminal may project an operation interface to the in-vehicle infotainment terminal in a mirror-image projection manner. In a case that it is detected that the mobile terminal application or the mirror image of the mobile terminal is suspended above the driving interface 7000 in a portrait state, a suspension selection control 1005 (as shown in FIG. 7) configured to indicate whether to add the target window to the driving interface 7000 may be generated. In this case, the user can trigger a window addition instruction for the target window through the suspension selection control 1005, which is convenient and fast.

In this embodiment, in a case that it is detected that the mobile terminal application or the mirror image of the mobile terminal is suspended above the driving interface in a portrait state, generation of the suspension selection control is triggered. That is, the in-vehicle infotainment terminal may trigger the generation of the suspension selection control under the driving interface. However, the generation of the suspension selection control is not triggered in a case that a parking interface and other interfaces block the driving interface in a full screen manner. In addition, in a case that it is detected that the mobile terminal application or the mirror image of the mobile terminal is suspended above the driving interface in a landscape state, the generation of the suspension selection control is not triggered, even if the state is subsequently switched to the portrait state.

In another embodiment, the user may add the target window to the driving interface through the mobile terminal interface. Specifically, in a case that the target window is the application interface of the mobile terminal application, the window addition instruction is transmitted by the mobile terminal, and the window addition instruction is transmitted to the in-vehicle infotainment terminal by the mobile terminal in a case that any one of the following conditions is satisfied: it is detected that an icon of the mobile terminal application in a mobile terminal interface is flipped to a direction of the driving interface; it is detected that a thumbnail image of the mobile terminal application in a nearest task thumbnail image interface of the mobile terminal is flipped to the direction of the driving interface; it is detected that a target option in a menu bar corresponding to the icon of the mobile terminal application is selected; or it is detected that a target option in a menu item corresponding to the thumbnail image of the mobile terminal application is selected.

The target option denotes addition to the in-vehicle infotainment terminal.

In this embodiment, the user may add the application interface of the mobile terminal application to the in-vehicle infotainment terminal through various methods.

In addition, the above method may further include: before the window addition instruction is transmitted by the mobile terminal, any one of the following conditions is satisfied: it is detected that the in-vehicle infotainment terminal is connected to the mobile terminal; or it is detected that the mobile terminal is located in a vehicle.

In addition, when the target window is displayed on the driving interface, in order to adapt to personalized requirements of the user, the user can freely switch the display mode of the target window in the driving interface according to the requirements. Specifically, the above method may further include steps as follows: the target window is switched from a current display mode to another display mode in response to receiving a switch instruction for the display mode of the target window in the driving interface.

In the disclosure, the current display mode is one of a landscape display mode and a portrait display mode, and the another display mode is the other one of the landscape display mode and the portrait display mode.

Figure 8:
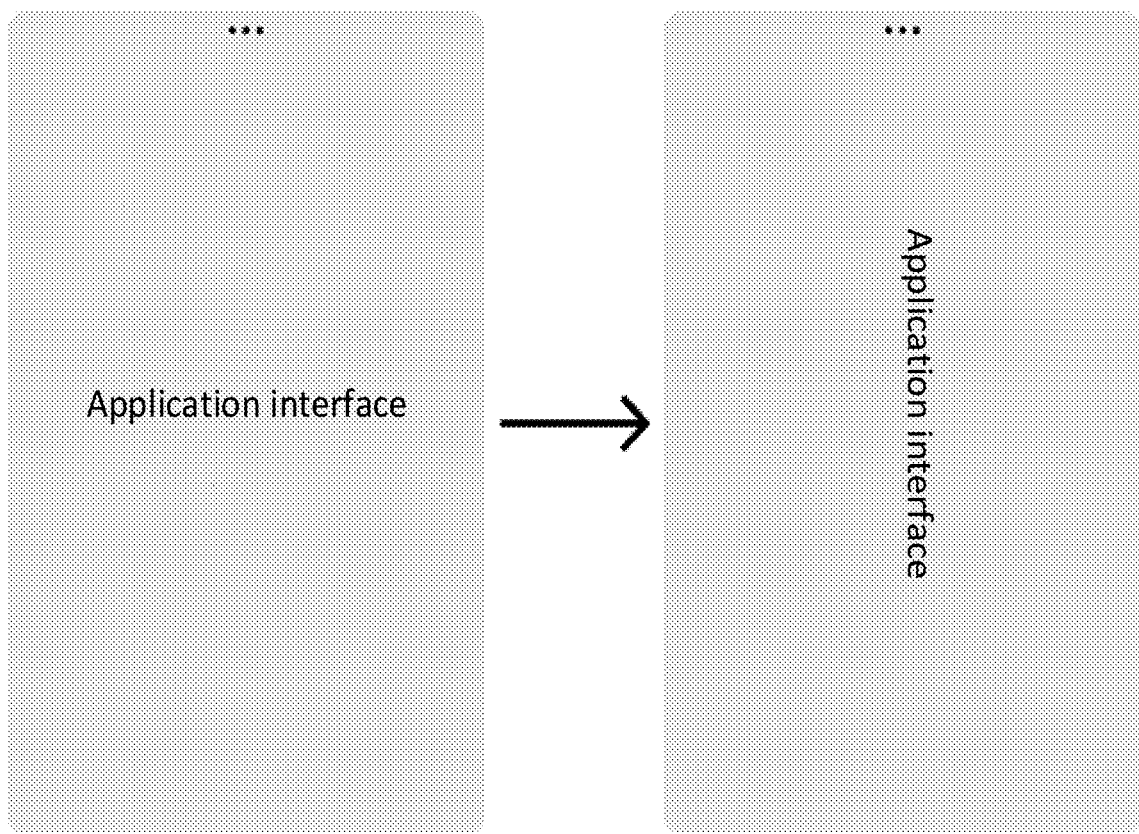
FIG. 8 is a schematic diagram of switching an application interface in a driving interface from a portrait display mode to a landscape display mode according to an example.

In an embodiment, the current display mode is the portrait display mode, and the another display mode is the landscape display mode. In this case, the switch instruction for the display mode is configured to instruct a switch of the target window from the portrait display mode to the landscape display mode (as shown in FIG. 8).

In another embodiment, the current display mode is the landscape display mode, and the another display mode is the portrait display mode. In this case, the switch instruction of the display mode is configured to instruct a switch of the target window from the landscape display mode to the portrait display mode.

When the target window is switched from the current display mode to another display mode, the size of the target window keeps unchanged before and after the display mode is switched. That is, a size and a length-to-width ratio of the target window and a window at which the target window is located in the driving interface keeps unchanged before and after the display mode is switched (as shown in FIG. 8). In this way, the problem of layout disorder when the application interface is switched between portrait and landscape states can be reduced such that convenience of use can be improved.

In addition, the target window is an application interface of a mobile terminal application. The above method may further include steps as follows: the icon of the mobile terminal application and an identifier of the mobile terminal are displayed in the target window in a case that it is detected that the in-vehicle infotainment terminal is not connected to the mobile terminal, and first reminding information configured to remind that the in-vehicle infotainment terminal is not connected to the mobile terminal is generated.

In the disclosure, when the in-vehicle infotainment terminal is just started, the in-vehicle infotainment terminal is not connected to the mobile terminal, or the in-vehicle infotainment terminal is connected to the mobile terminal, but the mobile terminal is disconnected from the in-vehicle infotainment terminal due to triggering of an overheating protection mechanism. In this case, it is considered that the in-vehicle infotainment terminal is not connected to the mobile terminal.

In a case that the in-vehicle infotainment terminal is not connected to the mobile terminal, the icon of the mobile terminal application and an identifier of the mobile terminal may be displayed in the target window, and first reminding information configured to remind that the in-vehicle infotainment terminal is not connected to the mobile terminal is generated. In this way, the user can conveniently know the connection state between the in-vehicle infotainment terminal and the mobile terminal in time, and trigger a connection in time when the in-vehicle infotainment terminal is not connected to the mobile terminal such that the mobile terminal application can be ensured to be normally displayed on the driving interface.

For instance, the mobile terminal is a mobile phone, as shown in FIG. 9A, when the in-vehicle infotainment terminal is just started, the in-vehicle infotainment terminal is not connected to the mobile terminal, an icon of the mobile terminal application and an identifier of the mobile phone may be displayed in the target window, and first reminding information that "mobile phone A (mobile phone name) is disconnected" may be generated.

For another instance, the mobile terminal is a mobile phone, as shown in FIG. 9B, when the mobile terminal is disconnected from the in-vehicle infotainment terminal due to triggering the overheating protection mechanism, an icon of the mobile terminal application and an identifier of the mobile phone may be displayed in the target window, and first reminding information that "mobile phone A (mobile phone name) is disconnected due to overheating" may be generated.

In a possible embodiment, the method may further include two steps as follows: a connection request is initiated to the mobile terminal in a case that a control operation for the target window is detected after the first reminding information is generated; and the mobile terminal application is controlled to be started after the in-vehicle infotainment terminal is connected to the mobile terminal.

In the disclosure, when the user knows that the in-vehicle infotainment terminal is not connected to the mobile terminal, the control operation can be triggered by clicking on any position of the target window. After the in-vehicle infotainment terminal detects the control operation, a connection between the in-vehicle infotainment terminal and the mobile terminal is automatically triggered back. That is, a connection request is initiated to the mobile terminal such that a connection is established with the mobile terminal. The mobile terminal application is controlled to be automatically started after the in-vehicle infotainment terminal is connected to the mobile terminal. In this way, the user can trigger the connection between the in-vehicle infotainment terminal and the mobile terminal back and self-starting of the mobile terminal application by clicking on any position of a window where the application interface of the mobile terminal application is located in the driving interface. The operation is simple, convenient and fast.

After the in-vehicle infotainment terminal is connected to the mobile terminal, the in-vehicle infotainment terminal controls the mobile terminal application to be started, but restart may fail. In this case, restart of the mobile terminal application may be tried for many times. When a number of times for which the restart fails reaches a preset number of times (such as 3 times), a bottom interface is output in the target window such that the user can be reminded that the mobile terminal application cannot be started. Specifically, the above method may further include steps as follows: in a case that the mobile terminal application fails to be started, a step of controlling the mobile terminal application to be started is re-executed until a number of times for which the mobile terminal application fails to be started reaches a preset number of times; and the icon of the mobile terminal application, the identifier of the mobile terminal, and a name of the mobile terminal application are displayed in the target window in a case that the number of times for which the mobile terminal application fails to be started reaches the preset number of times.

In the disclosure, when the mobile terminal application fails to be started, it is determined whether the number of times for which the mobile terminal application fails to be started reaches a preset number of times. In a case that the number of times for which the mobile terminal application fails to be started does not reach the preset number of times, the step of controlling the mobile terminal application to be started is re-executed. In a case that the mobile terminal application is successfully restarted, the application interface of the mobile terminal application is displayed in the target window. In a case that the number of times for which the mobile terminal application fails to be started reaches the preset number of times, the step of controlling the mobile terminal application to be started is not re-executed. In this case, an icon of the mobile terminal application, an identifier of the mobile terminal, and a name of the mobile terminal application may be displayed in the target window (as shown in FIG. 10).

In addition, after the mobile terminal application is uninstalled from the mobile terminal, the application interface of the mobile terminal application cannot be normally displayed on the driving interface. In this case, second reminding information configured to remind that no mobile terminal application is installed can be generated to remind the user that the mobile terminal application is not installed. Specifically, the method may further include steps as follows: in a case that it is detected that the mobile terminal application is not installed, the icon of the mobile terminal application and the identifier of the mobile terminal are displayed in the target window, and second reminding information configured to remind that the mobile terminal application is not installed is generated.

Figure 11:
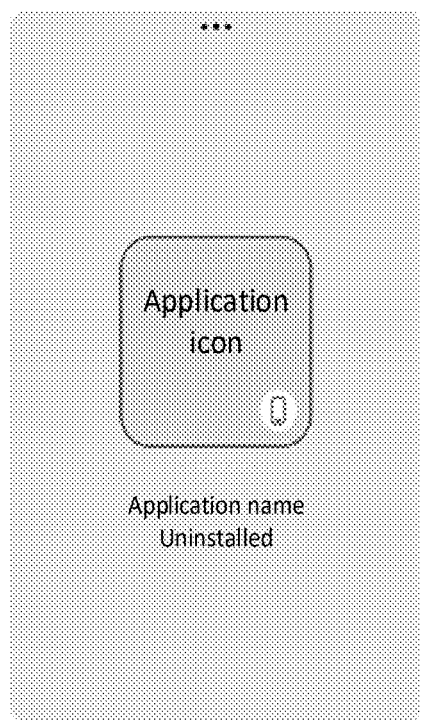
FIG. 11 is a schematic diagram of a display state in a case that a mobile terminal application is not installed according to an example.

For instance, the mobile terminal is a mobile phone, as shown in FIG. 11, in a case that it is detected that no mobile terminal application is installed, an icon of the mobile terminal application and an identifier of the mobile phone may be displayed in the target window. Moreover, second reminding information that "no mobile terminal application (application name) is installed" may be generated.

In consideration of performance and power consumption of the mobile terminal, the application interface of the mobile terminal application is displayed only on one of the in-vehicle infotainment terminal and the mobile phone terminal. That is, when the application interface of the mobile terminal application is mirrored and projected to the in-vehicle infotainment terminal, or when the application interface of the mobile terminal application is displayed on the driving interface, the application interface of the mobile terminal application will not be displayed at the mobile terminal. Similarly, when the user views the mobile terminal application at the mobile terminal, the application interface of the mobile terminal application will not be displayed on the in-vehicle infotainment terminal. Certainly, the application interface of the mobile terminal application cannot be displayed on the driving interface at the same time when the mirror image is projected to the in-vehicle infotainment terminal. Thus, when the mobile terminal application cannot be displayed on the driving interface, corresponding reminding information can be generated such that the user can conveniently understand the reason why the mobile terminal application cannot be displayed on the driving interface. Specifically, the target window is configured to display the application interface of the mobile terminal application. The method may further include steps as follows: in a case that it is detected that the mobile terminal application is opened at the mobile terminal or the mobile terminal application is in a mirror-image projection state, the icon of the mobile terminal application and the identifier of the mobile terminal are displayed in the target window, and third reminding information configured to remind a viewing position of the mobile terminal application is generated.

In the disclosure, in a case that it is detected that the mobile terminal application is opened at the mobile terminal, an icon of the mobile terminal application and an identifier of the mobile terminal may be displayed in the target window, and third reminding information configured to remind a viewing position of the mobile terminal application may be generated.

Figure 12:
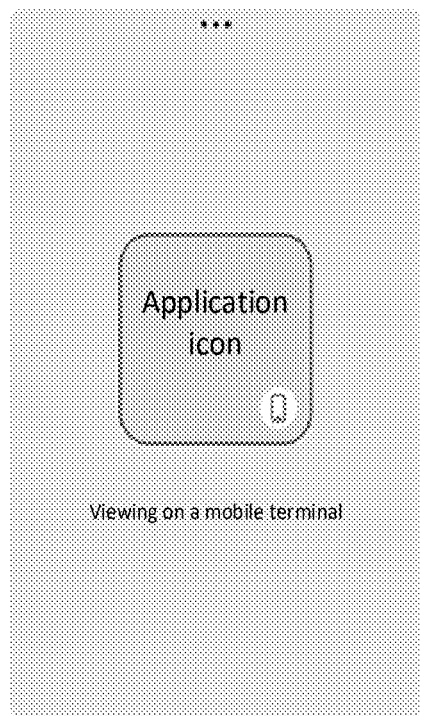
FIG. 12 is a schematic diagram of a viewing position of a mobile terminal application according to an example.

For instance, the mobile terminal is a mobile phone, as shown in FIG. 12, in a case that it is detected that the mobile terminal application is opened at the mobile terminal, an icon of the mobile terminal application and an identifier of the mobile phone may be displayed in the target window, and third reminding information of "viewing at the mobile terminal" may be generated.

In a case that it is detected that the mobile terminal application is in a mirror-image projection state, an icon of the mobile terminal application and an identifier of the mobile terminal may be displayed in the target window, and third reminding information configured to remind a viewing position of the mobile terminal application may be generated.

For instance, the mobile terminal is a mobile phone, in a case that it is detected that the mobile terminal application is in a mirror-image projection state, an icon of the mobile terminal application and an identifier of the mobile phone may be displayed in the target window, and third reminding information of "the mobile terminal application is being viewed in the mirror-image projection" may be generated.

When the application interface of the mobile terminal is closed or the mirror-image projection ends, display content of the target window can be automatically switched to the application interface of the mobile terminal application without user intervention such that a display position of the application interface of the mobile terminal application can be freely and conveniently switched. Specifically, the method may further include steps as follows: the display content of the target window is switched to the application interface of the mobile terminal application in a case that it is determined that the application interface of the mobile terminal application is closed or the mirror-image projection ends.

In addition, when the application interface of the mobile terminal application is displayed on the driving interface, audio data of the mobile terminal application may also be played on the in-vehicle infotainment terminal. For instance, the mobile terminal application is a video application, an audio application, a navigation application, etc. In this case, in order to avoid an audio conflict between the mobile terminal application and the in-vehicle infotainment terminal application, an audio channel of the mobile terminal may be split, and audio channels obtained by splitting may be mapped with the audio channel of the in-vehicle infotainment terminal. In this case, the audio data of the mobile terminal application may be played by an audio channel corresponding to the in-vehicle infotainment terminal, such that an audio play of the in-vehicle infotainment terminal application follows an in-vehicle infotainment terminal audio play strategy.

In addition, after an application in the driving interface is pushed out of the driving interface, the pushed out application will continue to run for preset duration at a background. After the preset duration, whether to end a running process of the pushed out application is determined according to a performance of the in-vehicle infotainment terminal. In this way, a restart delay caused by temporary push-out of the application to be pushed out can be avoided.

In order to improve personalization of a driving desktop, corresponding reference driving desktops can be pre-constructed for different driving scenes. In this way, when the in-vehicle infotainment terminal is started, the user can select an appropriate driving desktop from these reference driving desktops for display. In addition, the above reference driving desktop can also be bound with a user account. In this way, the reference driving desktop can be dynamically switched according to different users.

In the disclosure, the layout of the application window may be adjusted on the basis that the number of adjusted application windows is as small as possible such that effects of application window layout adjustment on the window queue can be reduced while application window layout adjustment efficiency is improved.

Specifically, the method may further include steps (a1)-(a5) as follows.

Step (a1): in response to receiving a window removal operation for the driving interface, a to-be-removed window is determined from the driving interface according to the window removal operation.

In the disclosure, the above-mentioned driving interface further includes window controls (as shown in FIG. 2A, three points at the top of the application window) set at a top of each application window. The user can implement a movement operation on the application window where the window controls are located through the window controls.

Step (a2): a to-be-removed window n is removed from the driving interface.

Step (a3): whether an (n+1)th application window exists is determined.

Step (a4): in a case that the (n+1)th application window exists, an application window having a serial number greater than a serial number of the to-be-removed window n is translated in sequence in the window queue to the starting point direction, and the application windows is displayed on the driving interface.

In a case that no (n+1)th application window exists, it is indicated that the driving interface includes a terminal window of the window queue. That is, no application window that can be added to the vacant window position vacated in the driving interface exists in the window queue. In this case, the display content of the driving interface is completely adjusted.

Step (a5): the driving interface is switched to a display interface previous to the driving interface in cases that n=1 and the to-be-removed window is not located at a starting point of the window queue.

In the disclosure, in cases that the number of the application window in the driving interface is 1 and the to-be-removed window is not located at the starting point of the window queue, it is indicated that the application window of the driving interface is the above-mentioned to-be-removed window, and the driving interface still exists on a previous display interface. In this case, the display interface of a display device may be switched from the driving interface to the display interface previous to the driving interface.

The embodiment of steps of translating an application window having a serial number greater than a serial number of the to-be-removed window n in sequence in the window queue to the starting point direction, and displaying the application window on the driving interface in step (a4) mentioned above will be described in detail. Specifically, this specific embodiment can be achieved by steps (a41) and (a42) as follows.

Step (a41): a first width of the (n+1)th application window and a second width of the to-be-removed window are acquired.

Step (a42): a translation strategy is determined according to a comparison result of the first width and the second width.

Then, according to the translation strategy, an application window having a serial number greater than a serial number of the to-be-removed window n in sequence in the window queue is translated to the starting point direction.

An embodiment of determining a translation strategy according to a comparison result of the first width and the second width in step (a42) will be described in detail.

In an embodiment, in a case that the first width of the (n+1)th application window is greater than the second width of the to-be-removed window, the translation strategy is to reduce the width of the (n+1)th application window to the second width of the to-be-removed window, translate the (n+1)th application window to the starting point direction, and display the (n+1)th application window on the driving interface.

For instance, n=3 and the driving interface includes three application windows with a width of d/3. Correspondingly, the width of the to-be-removed window is also d/3. The to-be-removed window is window 3. In a case that the first width of the fourth application window (that is window 4) is 2d/3 and greater than the second width of the to-be-removed window, the translation strategy is to reduce the width of window 4 to d/3, translate window 4 to the starting point direction and display window 4 on the driving interface.

Figure 14:
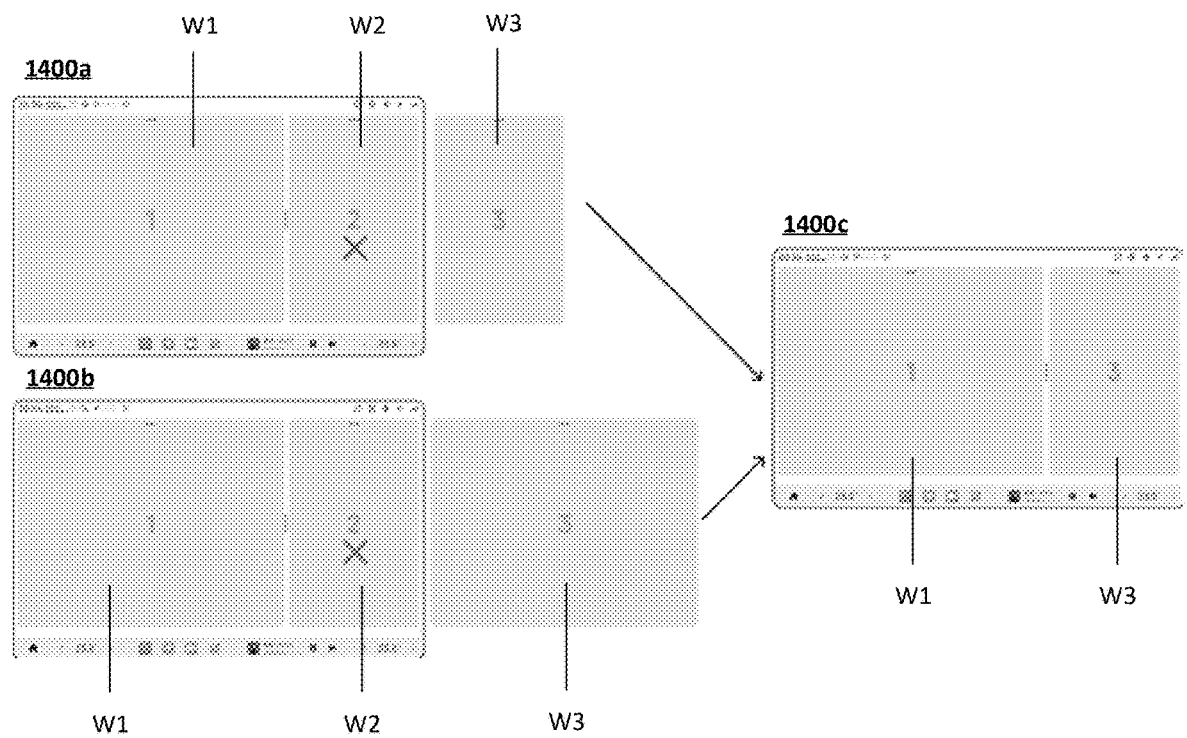
FIG. 14 is a schematic diagram of removing an application window according to another example.

For another instance, as shown in a driving interface 1400*a* at a lower left corner of FIG. 14, n=2, the driving interface 1400*a* includes two application windows. The width of the application window close to the starting point direction (window 1 W1) is 2d/3. The width of the application window far away from the starting point direction (window 2 W2) is d/3. The to-be-removed window is window 2 W2. The width of the third application window (that is, window 3 W3) is 2d/3 and is greater than the width of the to-be-removed window W2. Then, the translation strategy is to reduce the width of window 3 W3 to d/3, translate window 3 to a position opposite the starting point direction and display window 3 on the driving interface 1400*c*.

In another embodiment, in a case that the first width of the (n+1)th application window is equal to the second width of the to-be-removed window, the translation strategy is to keep the width of the (n+1)th application window unchanged, translate the (n+1)th application window to the starting point direction and display the (n+1)th application window on the driving interface.

Figure 13:
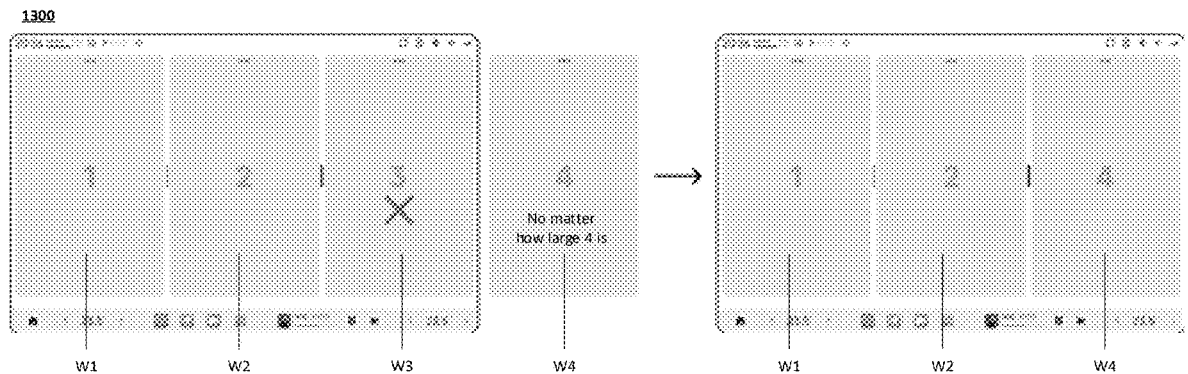
FIG. 13 is a schematic diagram of removing an application window according to an example.

For instance, as shown in FIG. 13, n=3 and the driving interface 1300 includes three application windows with a width of d/3. Correspondingly, the width of the to-be-removed window is also d/3. The to-be-removed window is window 3 W3. In a case that the first width of the fourth application window (that is window 4 W4) is d/3 and equal to the second width of the to-be-removed window, the translation strategy is to keep the width of window 4 unchanged, translate window 4 to a position opposite the starting point direction and display window 4 on the driving interface 1300.

For another instance, as shown in the driving interface 1400*b* at an upper left corner of FIG. 14, n=2, and the driving interface 1400*b* includes two application windows. The width of the application window W1 close to the starting point direction is 2d/3. The width of the application window W2 far away from the starting point direction is d/3. The to-be-removed window is window 2 W2. The width of the third application window (that is window 3 W3) is d/3 and is equal to the width of the to-be-removed window W2. Then, the translation strategy is to keep the width of window 3 W3 unchanged, translate window 3 W3 to a position opposite the starting point direction and display window 3 W3 on the driving interface 1400*c*.

Figure 15:
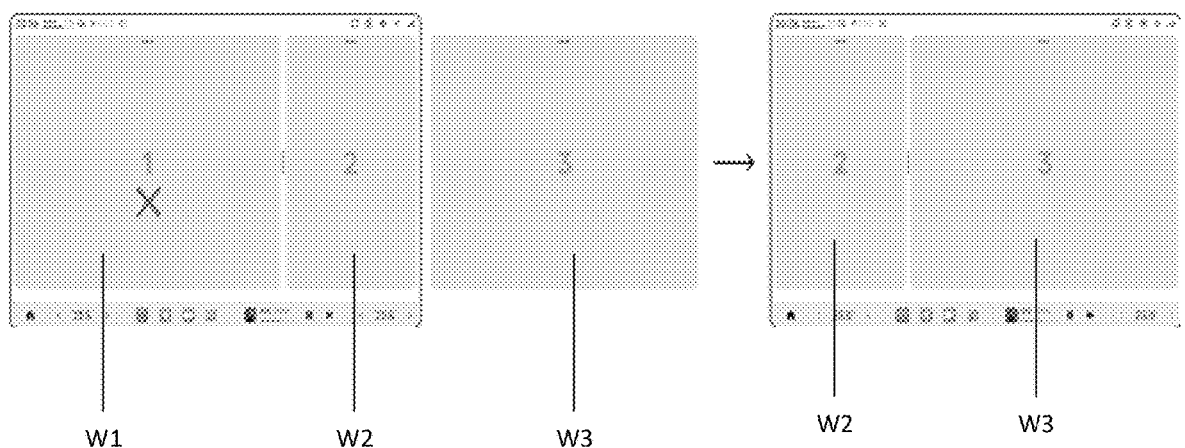
FIG. 15 is a schematic diagram of removing an application window according to yet another example.

For another instance, as shown in FIG. 15, n=2, and the driving interface 1500 includes two application windows. The width of the application window W1 close to the starting point direction is 2d/3. The width of the application window W2 far away from the starting point direction is d/3. The to-be-removed window is window 1 W1. The width of the to-be-removed window is 2d/3. The width of the third application window (that is, window 3 W3) is 2d/3, and is equal to the width of the to-be-removed window W1. Then, the translation strategy is to keep the width of window 3 W3 unchanged, translate window 3 to a position opposite the starting point direction and display window 3 on the driving interface 1500.

In yet another embodiment, in a case that the first width of the (n+1)th application window is less than the second width of the to-be-removed window and an (n+2)th application window exists, the translation strategy is to keep a width of the (n+1)th application window unchanged, translate the (n+1)th application window to the starting point direction, display the (n+1)th application window on the driving interface, translate the (n+2)th application window with a width equaling a difference between the second width and the first width to the starting point direction, and display the (n+2)th application window on the driving interface. No matter how great the width of the (n+2)th application window is, the (n+2)th application window with the width of d/3 is translated to the starting point direction and displayed on the driving interface.

Figure 16:
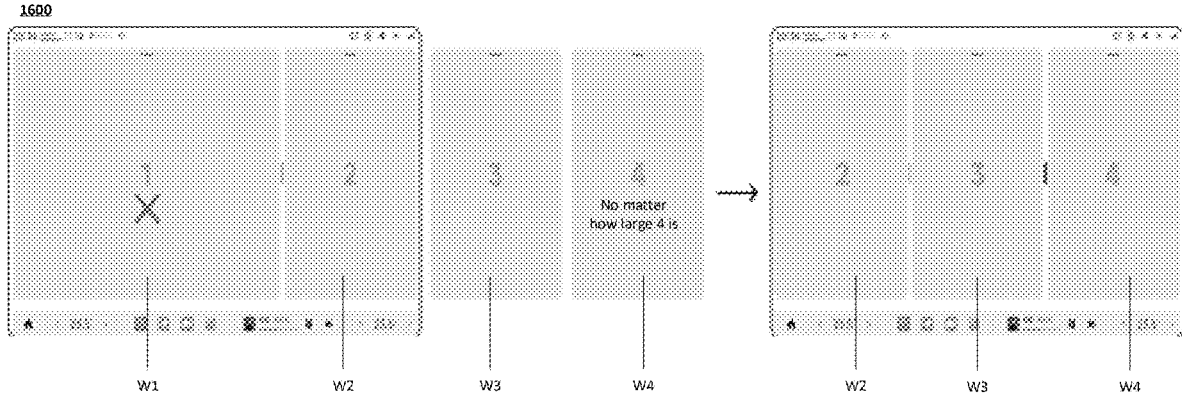
FIG. 16 is a schematic diagram of removing an application window according to still another example.

For instance, as shown in FIG. 16, the driving interface 1600 includes two application windows. The width of the application window W1 close to the starting point direction is 2d/3. The width of the application window W2 far away from the starting point direction is d/3. The to-be-removed window is window 1 W1. The width of the to-be-removed window is 2d/3. The width of the third application window (that is, window 3 W3) is d/3, and is less than the width of the to-be-removed window. A fourth application window (that is, window 4 W4) exists. In this case, the translation strategy is to move window 2 W2 to a position closest to the starting point direction, keep the width of window 3 W3 unchanged, translate window 3 W3 to the next position in the starting point direction and display window 3 W3 on the driving interface 1600. Window 4 W4 with a width equaling a difference between the second width and the first width (that is, d/3) is translated to a position opposite the starting point direction and displayed on the driving interface 1600. No matter how great the width of window 4 W4 is, window 4 with the width that is the difference between the second width and the first width is translated to a position opposite the starting point direction.

In another embodiment, in a case that the first width of the (n+1)th application window is less than the second width of the to-be-removed window and no (n+2)th application window exists, the translation strategy is to keep the width of the (n+1)th application window unchanged, translate the (n+1)th application window to the starting point direction, and display the (n+1)th application window on the driving interface.

In the disclosure, in cases that the first width of the (n+1)th application window is less than the second width of the to-be-removed window and no (n+2)th application window exists, the width of the (n+1)th application window can be kept unchanged, and the (n+1)th application window is translated to the starting point direction and displayed on the driving interface. Then, the driving interface further includes a vacant window position. Since no (n+2)th application window exists, that is, the (n+1)th application window is a terminal window of the window queue. In this case, window filling is not carried out on the vacant window position.

In addition, the driving interface further includes a width adjustment control set between every two adjacent application windows. The width adjustment control is configured to adjust the width of the application window. For instance, in a case that the starting point direction is from right to left, the width adjustment control is configured to adjust the width of the application window on the left side of the application window. The width of the corresponding application window can be adjusted by carrying out drag or click (including single click and double click, for instance, single click of the width adjustment control indicates an increase with the width of the corresponding application window, and double click of the width adjustment control indicates decrease with the width of the corresponding application window) on the width adjustment control. The width of the application window can be switched between two sizes of d/3 and 2d/3.

Figure 17:
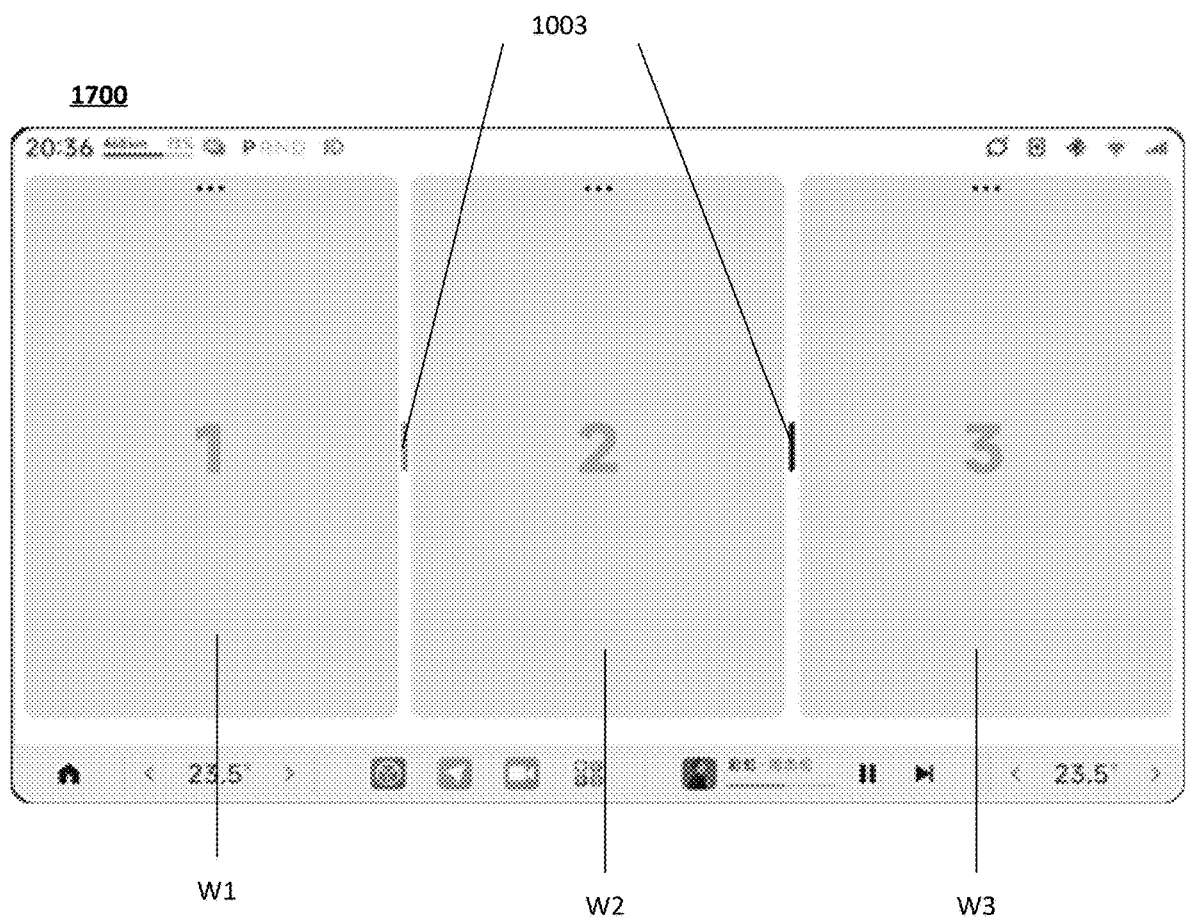
FIG. 17 is a schematic diagram of a driving interface according to still another example.

For instance, as shown in FIG. 17, the driving interface 1700 includes window 1 W1, window 2 W2, and window 3 W3. A width adjustment control 1003 (that is, a vertical bar) is set between window 1 W1 and window 2 W2. A width adjustment control 1003 (that is, vertical bar) is set between window 2 W2 and window 3 W3. The width adjustment control 1003 between window 1 W1 and window 2 W2 is configured to adjust the width of window 1 W1. The width adjustment control 1003 between window 2 W2 and window 3 W3 is configured to adjust the width of window 2 W2.

Figure 18A:
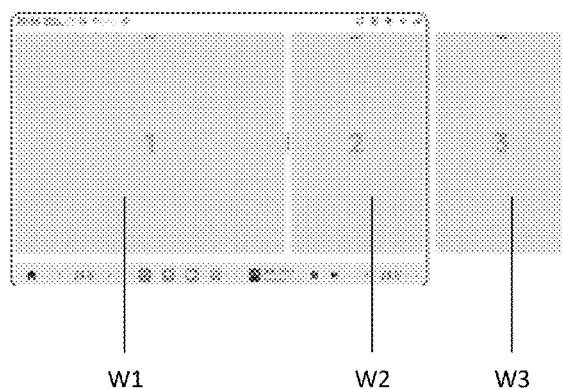
FIG. 18A is a schematic diagram of adjusting a width of an application window according to an example.
Figure 18B:
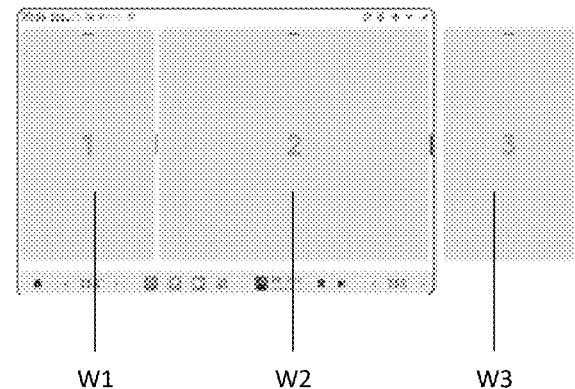
FIG. 18B is a schematic diagram of adjusting a width of an application window according to another example.

In addition, in a case that the width of the application window far away from the starting point direction is 2d/3, the driving interface further includes a width adjustment control arranged on a second vertical edge of the driving interface far away from the starting point direction. As shown in FIGS. 18B and 4C, the driving interface further includes a width adjustment control arranged on a right edge (that is, a second vertical edge) of the driving interface.

In a possible embodiment, the above method may further include: a window width adjustment operation for the driving interface is received; and at least a width of the application window of the driving interface is adjusted according to the first control operation and the window queue.

The window width adjustment operation may be a first control operation for any one of the width adjustment control in the driving interface. The first control operation may be a drag operation, a click operation, etc.

Specifically, according to the first control operation and the window queue, at least the width of the application window of the driving interface is adjusted.

The embodiment of adjusting at least the width of the application window of the driving interface according to the first control operation and the window queue will be described in detail below.

In an embodiment, n=3, and the widths of the n application windows are all d/3. In a case that the first control operation is to drag any one of the width adjustment controls away from the starting point direction, a width of a target application window is stretched to 2d/3. An nth application window in the driving interface is pushed to a display interface subsequent to the driving interface. The target application window is an application window, close to the starting point direction, of application windows at two ends of the width adjustment control targeted by the first control operation.

In the disclosure, in a case that the number of the application windows in the driving interface is 3, the widths of the three application windows in the driving interface are all d/3. In this case, the driving interface includes two width adjustment controls. The width of the target application window can be stretched to 2d/3 by dragging any one of the width adjustment controls away from the starting point direction. In this case, the nth application window in the driving interface is pushed out of the driving interface.

For instance, the driving interface 1700 is shown in FIG. 17, and the width of window 1 W1 is increased by dragging the width adjustment control 1003 between window 1 W1 and window 2 W2 to the right. In this case, the width of window 1 W1 is adjusted from d/3 to 2d/3, window 3 W3 is pushed out of the driving interface, and the driving interface 1800a, shown in FIG. 18A, is obtained.

For another instance, the driving interface 1700 is shown in FIG. 17, and the width of window 2 W2 is increased by dragging the width adjustment control 1003 between window 2 W2 and window 3 W3 to the right. In this case, the width of window 2 W2 is adjusted from d/3 to 2d/3, window 3 W3 is pushed out of the driving interface, and the driving interface 1800b, shown in FIG. 18B, is obtained.

In another embodiment, n=2, the widths of n application windows are d/3 or 2d/3, and the application window with the width of 2d/3 in the driving interface is close to the starting point direction. In cases that the first control operation is to drag the width adjustment control to the starting point direction and an (n+1)th application window exists, the width of the application window close to the starting point direction is reduced to d/3, an application window far away from the starting point direction and the (n+1)th application window with a width of d/3 in the driving interface are translated to the starting point direction, and the application window far away from the starting point direction and the (n+1)th application window are displayed on the driving interface.

In the disclosure, in cases that the number of the application windows included in the driving interface is 2, and the application window with the width of 2d/3 in the driving interface is close to the starting point direction, the driving interface includes a width adjustment control. The width of the application window close to the starting point direction can be reduced to d/3 by dragging the width adjustment control to the starting point direction. Then, whether an (n+1)th application window exists is determined. In a case that an (n+1)th application window exists, the (n+1)th application window with a width of d/3 is added to a new vacant window position. In a case that no (n+1)th application window exists, no window filling operation is required.

For instance, as shown in FIG. 4B, the driving interface 4000b includes window 1 W1 with a width of 2d/3 close to the starting point direction and window 2 W2 with a width of d/3 far away from the starting point direction. In this case, the width of window 1 W1 can be adjusted to d/3 by dragging the width adjustment control 1003 between window 1 W1 and window 2 W2 to the left. Since window 1 W1 is not a rightmost application window in the driving interface 4000b, window 2 W2 is moved to the left to be adjacent to window 1 W1. In this case, the driving interface 4000a, as shown in FIG. 4A, is obtained and includes a new vacant window position 1008 with a width of d/3 adjacent to a right edge of the driving interface 4000a. In a case that (n+1)th application window "window 3" exists, window 3 W3 is added to the new vacant window position, and the driving interface 1700 shown in FIG. 17 is obtained. In a case that no (n+1)th application window exists, no window filling operation is required, and the driving interface 4000a shown in FIG. 4A is obtained.

In yet another embodiment, n=2, the widths of the n application windows are d/3 and 2d/3. The application window with the width of d/3 in the driving interface is close to the starting point direction. In this case, according to the first control operation and the window queue, at least the width of the application window of the driving interface may be adjusted through a method as follows: in a case that the first control operation is to drag a width adjustment control close to the starting point direction away from the starting point direction, stretch a width of a first application window in the driving interface to 2d/3, and reduce a width of a second application window in the driving interface to d/3.

In the disclosure, in cases that the number of the application windows included in the driving interface is 2 and the application window with the width of d/3 in the driving interface is close to the starting point direction, the driving interface includes two width adjustment controls. The width of the first application window in the driving interface can be stretched to 2d/3 by dragging the width adjustment control between the two application windows away from the starting point direction. That is, the width of the application window close to the starting point direction can be stretched to 2d/3, and the width of the second application window in the driving interface is reduced to d/3.

As shown in FIG. 4C, the driving interface 4000c includes window 1 W1 with a width of d/3 close to the starting point direction and window 2 W2 with a width of 2d/3 far away from the starting point direction. In this case, the width of window 1 W1 can be adjusted to 2d/3 by dragging the width adjustment control 1003 between window 1 W1 and window 2 W2 to the left. In this case, a sum of the width of window 1 W1 and the width of window 2 W2 is greater than d. In order to reduce a number of application windows to be adjusted as much as possible, the width of window 2 W2 can be adjusted to d/3, and the driving interface 4000b, shown in FIG. 4B, is obtained.

In a case that the first control operation is to drag a width adjustment control far away from the starting point direction to the starting point direction, the width of the application window far away from the starting point direction is reduced to d/3. In a case that an (n+1)th application window exists, the (n+1)th application window with a width of d/3 is translated to the starting point direction and displayed on the driving interface.

In the disclosure, in cases that a number of the application windows included in the driving interface is 2 and the application window with the width of d/3 in the driving interface is close to the starting point direction, the driving interface includes two width adjustment controls. The width of the application window far away from the starting point direction can be reduced to d/3 by dragging the width adjustment control (the width adjustment control on the second vertical edge) far away from the starting point direction to the starting point direction. Then, it is determined whether an (n+1)th application window exists. In a case that the (n+1)th application window exists, the (n+1)th application window with a width of d/3 is translated to the starting point direction and displayed on the driving interface. In a case that no (n+1)th application window exists, no filling operation is required. In this case, the driving interface includes a vacant window position with a width of d/3.

For instance, as shown in FIG. 4C, the driving interface 4000c includes window 1 W1 with a width of d/3 close to the starting point direction and window 2 W2 with a width of 2d/3 far away from the starting point direction. In this case, the width of window 2 W2 can be adjusted to d/3 by dragging the width adjustment control 1003 between window 2 W2 and the driving interface 4000c to the left. Since window 2 W2 is a rightmost application window in the driving interface 4000c, no window left movement operation is required. In this case, the driving interface 4000a, as shown in FIG. 4A is obtained, and includes a new vacant window position 1008 with a width of d/3 adjacent to a right edge of the driving interface 4000a. In a case that (n+1)th application window "window 3" exists, window 3 is added to the above-mentioned new vacant window position, and the driving interface 1700 shown in FIG. 17 is obtained. In a case that no (n+1)th application window exists, no window filling operation is required, and the driving interface 4000a shown in FIG. 4A is obtained.

In another embodiment, in cases that n=2 and the widths of the two application windows in the driving interface are both d/3, that is, in a case that the first control operation is to drag any one of the width adjustment controls away from the starting point direction, the width of the target application window is stretched to 2d/3.

In the disclosure, in cases that the number of application windows in the driving interface is 2 and a vacant window position exists in the driving interface, it is indicated that the driving interface includes two application windows with a width of d/3 and a vacant window position with a width of d/3, and the driving interface includes two width adjustment controls. In a case that any one of the width adjustment controls is dragged away from the starting point direction, the width of the target application window can be adjusted to 2d/3. In this case, a sum of the width of the adjusted first target application window and the width of another application window is just equal to d, and window extrusion and window filling operations are not required.

As shown in FIG. 4A, the driving interface 4000a includes window 1 W1 with a width of d/3 and window 2 W2 with a width of d/3. In this case, the width of window 2 W2 can be adjusted to 2d/3 by dragging the width adjustment control 1003 on the right side of window 2 W2 to the left, and the driving interface 4000c shown in FIG. 4C is obtained. Alternatively, the width of window 1 W1 can be adjusted to 2d/3 by dragging the width adjustment control 1003 between window 1 W1 and window 2 W2, and the driving interface 4000b shown in FIG. 4B is obtained.

In another embodiment, under the condition that n=1 (the driving interface includes a width adjustment control), in cases that the width of the application window is 2d/3 and the first control operation is to drag the width adjustment control to the starting point direction, the width of the application window is adjusted to 2d/3. In cases that the width of the application window is d/3 and the first control operation is to drag the width adjustment control away from the starting point direction, the width of the application window is adjusted to d/3.

For instance, as shown in FIG. 3A, the driving interface 3000a includes window 1 W1 with a width of 2d/3, the width of window 1 W1 is adjusted to d/3 by dragging the width adjustment control 1003 on the right side of window 1 W1 to the left, and the driving interface 3000b shown in FIG. 3B is obtained.

For another instance, as shown in FIG. 3B, the driving interface 3000b includes window 1 W1 with a width of d/3, and the width of window 1 W1 is adjusted to 2d/3 by dragging the width adjustment control 1003 on the right side of window 1 W1 to the right, and the driving interface 3000a shown in FIG. 3A is obtained.

In addition, in cases that n=3, the widths of the n application windows are all d/3, and a first application window in the driving interface is located at a starting point of the window queue, a width adjustment control close to the starting point direction is further configured to adjust a width of an application window, far away from the starting point direction, of application windows at two ends of the width adjustment control. That is, in a case that the first application window in the driving interface is located at the starting point of the window queue, the width adjustment control between the first application window and the second application window can be configured to adjust not only the width of the first application window, but also the width of the second application window.

For instance, as shown in FIG. 17, leftmost application window "window 1" W1 in the driving interface 1700 is a starting-point window of the window queue. Then, the width adjustment control 1003 between window 1 W1 and window 2 W2 can be configured to adjust the width of window 1 W1 and the width of window 2 W2.

In this case, the step of adjusting at least the width of the application window of the driving interface 1700 according to the first control operation and the window queue may further include steps as follows: a width of a second application window in the driving interface is adjusted to 2d/3 in a case that the first control operation is to drag the width adjustment control close to the starting point direction to the starting point direction, where the first application window is temporarily pushed out of the driving interface in the starting point direction.

Figure 19:
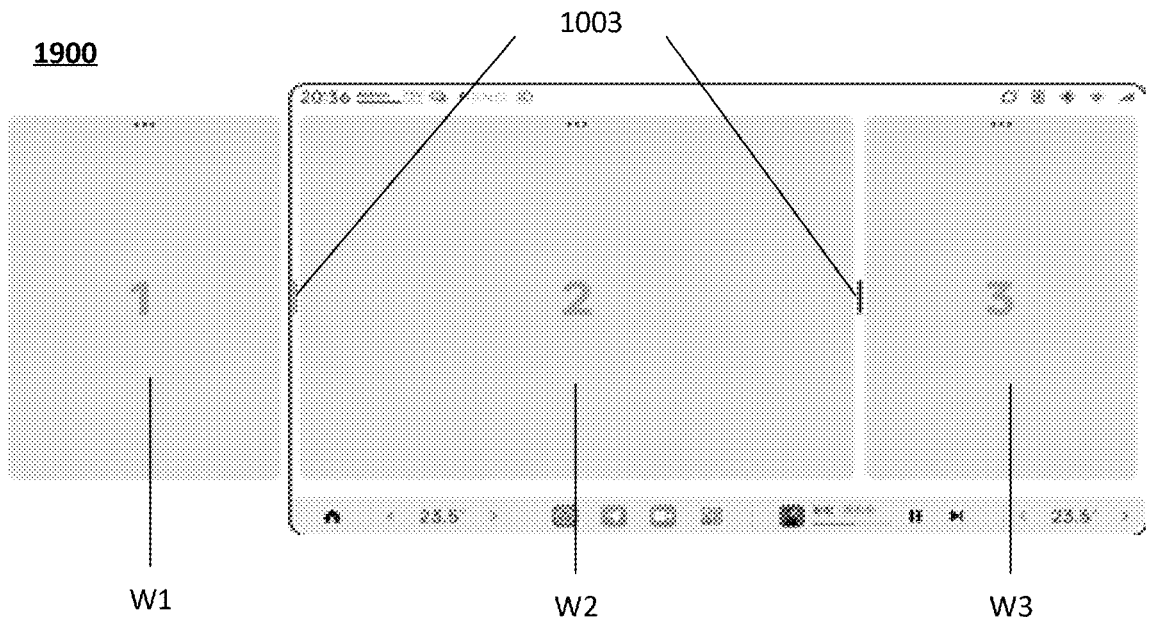
FIG. 19 is a schematic diagram of adjusting a width of an application window according to yet another example.

For instance, as shown in FIG. 17, the width of window 2 W2 is increased by dragging the width adjustment control 1003 between window 1 W1 and window 2 W2 to the left. In this case, the width of window 2 W2 is adjusted from d/3 to 2d/3, window 1 W1 is temporarily pushed out of the driving interface, and the driving interface 1900 shown in FIG. 19 is obtained.

In cases that the number of application windows in the driving interface is 3 and the first control operation is to drag the width adjustment control close to the starting point direction to the starting point direction, the width of the second application window of the driving interface is adjusted to 2d/3, and the first application window of the driving interface is temporarily pushed out of the driving interface.

After the first application window of the driving interface is temporarily pushed out of the driving interface, the method may further include two steps as follows: a width adjustment control is displayed on a first vertical edge of the driving interface close to the starting point direction; and the width of the second application window of the driving interface is adjusted to d/3 in response to receiving a second control operation for the width adjustment control on the first vertical edge, and the first application window temporarily pushed out of the driving interface is translated back to the driving interface.

In the disclosure, the second control operation is to drag the width adjustment control on the first vertical edge away from the starting point direction. When a second control operation for the width adjustment control on the first vertical edge is received, the width of the second application window of the driving interface can be adjusted to d/3, such that the window closest to the starting point direction is vacated. Then, the first application window temporarily pushed out of the display interface may be translated back to the vacated window.

For instance, as shown in FIG. 19, after window 1 W1 is temporarily pushed out of the driving interface 1900, a width adjustment control 1003 is displayed between window 2 W2 and the left edge of the driving interface 1900. When the width adjustment control 1003 is dragged to the right, the width of window 2 W2 may be adjusted to d/3 such that a window adjacent to the left edge of the driving interface can be vacated. Then, window 1 W1 temporarily pushed out may be translated back to the vacated window, and the driving interface 1700 shown in FIG. 17 is obtained.

Figure 20:
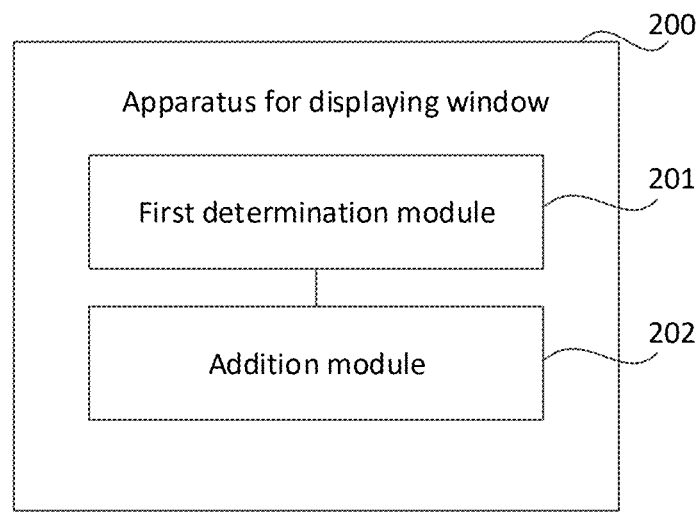
FIG. 20 is a block diagram of an apparatus for displaying a window according to an example.

FIG. 20 is a block diagram of an apparatus for displaying a window 200 according to an example. The apparatus for displaying a window 200 is performed by an in-vehicle infotainment terminal. The driving interface of the in-vehicle infotainment terminal includes n application windows, and n>1. In a case that n>1, the n application windows are transversely arranged adjacent to each other.

The apparatus 200 includes a first determination module 201 and an addition module 202.

The first determination module 201 is configured to determine an existence condition of a vacant window position in the driving interface in response to receiving a window addition instruction for a target window, where the target window is configured to display an application interface of a mobile terminal application or a mirror image of the mobile terminal.

The addition module 202 is configured to add the target window to the driving interface according to the existence condition.

A window queue is configured for the n application windows to be continuously arranged adjacent to each other. A state of the window queue is dynamically updated as a window layout of the driving interface changes. Serial numbers of the application windows in the window queue increase in sequence in a direction opposite to a starting point direction. A serial number of an application window, closest to the starting point direction, of the n application windows is 1. The starting point direction is a direction, close to a driver side, of the in-vehicle infotainment terminal.

At least part of a region of the window queue overlaps the driving interface, so as to ensure that the application windows in the window queue are displayed in the driving interface.

The technical solutions provided by examples of the disclosure can include beneficial effects as follows: after receiving the window addition instruction for the mobile terminal application or the mirror image of the mobile terminal, the in-vehicle infotainment terminal adaptively adjusts the window layout of the driving interface according to the existence condition of the vacant window position in the driving interface and the number of the application windows in the driving interface such that the application interface of the mobile terminal application or the mirror image of the mobile terminal can be added to the driving interface, and the content of the in-vehicle infotainment terminal and the mobile terminal application can be simultaneously displayed at the in-vehicle infotainment terminal. The display content of the driving interface can be richer, an in-vehicle infotainment terminal application and the mobile terminal are simultaneously operated in the driving interface by a user conveniently, and use experience can be improved.

Optionally, n=2, widths of the n application windows each are d/3 or 2d/3, and d is a width of the driving interface.

The addition module 202 may include a first addition sub-module and a second addition sub-module. The first addition sub-module is configured to reduce, in a case that no vacant window position exists in the driving interface, a width of an application window with a width of 2d/3 in the driving interface to d/3, add 1 to n, and add the target window with a width of d/3 as an nth application window of the driving interface to the driving interface. The second addition sub-module is configured to add, in a case that a vacant window position exists in the driving interface, the target window to the vacant window position of the original driving interface.

Optionally, n=1, widths of the n application windows each are d, a width of the target window is d/3, and d is a width of the driving interface.

The addition module 202 may further includes a third addition sub-module. The third addition sub-module is configured to adjust the width of the application window in the driving interface to 2d/3, add 1 to n, and add the target window with a width of d/3 as an nth application window of the driving interface to the driving interface.

Optionally, n=1, a width of the application window is d/3 or 2d/3, and d is a width of the driving interface.

The addition module 202 may further include a fourth addition sub-module. The fourth addition sub-module is configured to add the target window to the vacant window position adjacent to the application window of the original driving interface, and execute n+1.

Optionally, n=3, widths of the n application windows are all d/3, and d is a width of the driving interface.

The addition module 202 may further include a fifth addition sub-module is configured to add the target window with a width of d/3 to a position at which an nth application window in the driving interface is located, where the original nth application window in the driving interface is pushed to a display interface subsequent to the driving interface.

Optionally, the addition module 202 may further include a sixth addition sub-module. The sixth addition sub-module is configured to adjust, in a case that a vacant window position exists in the driving interface and according to a width of the vacant window position and a width of the target window, the width of the target window, and add the target window to the vacant window position.

Optionally, the sixth addition sub-module includes a seventh addition sub-module and an eighth addition sub-module. The seventh addition sub-module is configured to add, in a case that the width of the target window is less than or equal to the width of the vacant window position, the target window to the vacant window position according to an original width. The eighth addition sub-module is configured to reduce, in a case that the width of the target window is greater than the width of the vacant window position, the width of the target window to the width of the vacant window position, and add the target window to the vacant window position.

Optionally, the apparatus 200 further includes a generation module and a second determination module. The generation module is configured to generate a suspension selection control in response to detecting that the mobile terminal application or the mirror image of the mobile terminal is suspended above the driving interface in a portrait state, where the suspension selection control is configured to indicate whether to add the target window to the driving interface. The second determination module is configured to determine, in response to receiving a trigger operation for the suspension selection control, that the window addition instruction is received.

Optionally, the target window is the application interface of the mobile terminal application, the window addition instruction is transmitted by the mobile terminal, and the window addition instruction is transmitted to the in-vehicle infotainment terminal by the mobile terminal in a case that any one of the following conditions is satisfied: it is detected that an icon of the mobile terminal application in a mobile terminal interface is flipped to a direction of the driving interface; it is detected that a thumbnail image of the mobile terminal application in a nearest task thumbnail image interface of the mobile terminal is flipped to the direction of the driving interface; it is detected that a target option in a menu bar corresponding to the icon of the mobile terminal application is selected; or it is detected that a target option in a menu item corresponding to the thumbnail image of the mobile terminal application is selected.

The target option denotes addition to the in-vehicle infotainment terminal.

Optionally, the step of satisfying, before the window addition instruction is transmitted by the mobile terminal, any one of the following conditions: it is detected that the in-vehicle infotainment terminal is connected to the mobile terminal; or it is detected that the mobile terminal is located in a vehicle.

Optionally, the apparatus 200 further includes a first switch module. The first switch module is configured to switch the target window from a current display mode to another display mode in response to receiving a switch instruction for a display mode of the target window in the driving interface. Where a size of the target window keeps unchanged before and after the display mode is switched, the current display mode is one of a landscape display mode and a portrait display mode, and the another display mode is the other one of the landscape display mode and the portrait display mode.

Optionally, the target window is an application interface of a mobile terminal application.

Optionally, the apparatus 200 further includes a first display module. The first display module is configured to display the icon of the mobile terminal application and an identifier of the mobile terminal in the target window in a case that it is detected that the in-vehicle infotainment terminal is not connected to the mobile terminal, and generate first reminding information configured to remind that the in-vehicle infotainment terminal is not connected to the mobile terminal.

Optionally, the apparatus 200 further includes a transmission module and a control module. The transmission module is configured to initiate a connection request to the mobile terminal in a case that a control operation for the target window is detected after the first reminding information is generated. The control module is configured to control the mobile terminal application to be started after the in-vehicle infotainment terminal is connected to the mobile terminal.

Optionally, the apparatus 200 further includes: a trigger module and a second display module. The trigger module is configured to trigger, in a case that the mobile terminal application fails to be started, the control module to control the mobile terminal application to be started until a number of times for which the mobile terminal application fails to be started reaches a preset number of times. The second display module is configured to display the icon of the mobile terminal application, the identifier of the mobile terminal, and a name of the mobile terminal application in the target window in a case that the number of times reaches the preset number of times.

Optionally, the target window is an application interface of a mobile terminal application. The apparatus 200 may further include a third display module. The third display module is configured to display, in a case that it is detected that the mobile terminal application is not installed, the icon of the mobile terminal application and the identifier of the mobile terminal in the target window, and generate second reminding information configured to remind that the mobile terminal application is not installed.

Optionally, the target window is configured to display the application interface of the mobile terminal application. The apparatus 200 may further include a fourth display module. The fourth display module is configured to display, in a case that it is detected that the mobile terminal application is opened at the mobile terminal or the mobile terminal application is in a mirror-image projection state, the icon of the mobile terminal application and the identifier of the mobile terminal in the target window, and generate third reminding information configured to remind a viewing position of the mobile terminal application.

Optionally, the apparatus 200 further includes a second switch module. The second switch module is configured to switch display content of the target window to the application interface in a case that it is determined that the application interface of the mobile terminal is closed or mirror-image projection is finished.

Optionally, the apparatus 200 further includes a third determination module, a removal module, a fourth determination module, and a translation module. The third determination module is configured to determine, in response to receiving a window removal operation for the driving interface, a to-be-removed window from the driving interface according to the window removal operation. The removal module is configured to remove to-be-removed window n from the driving interface. The fourth determination module is configured to determine whether an (n+1)th application window exists. The translation module is configured to translate, in a case that the (n+1)th application window exists, an application window having a serial number greater than a serial number of the to-be-removed window n in sequence in the window queue to the starting point direction, and display the application windows on the driving interface.

Optionally, the translation module includes an acquisition sub-module and a first determination sub-module. The acquisition sub-module is configured to acquire a first width of the (n+1)th application window and a second width of the to-be-removed window. The first determination sub-module configured to determine a translation strategy according to a comparison result of the first width and the second width.

Optionally, the first determination sub-module includes a second determination sub-module. The second determination sub-module is configured to determine, in a case that the first width is greater than the second width, that the translation strategy is to reduce a width of the (n+1)th application window to the second width, translate the (n+1)th application window to the starting point direction, and display the (n+1)th application window on the driving interface.

Optionally, the first determination sub-module includes a third determination sub-module and a fourth determination sub-module. The third determination sub-module is configured to determine, in cases that the first width is less than the second width and an (n+2)th application window exists, that the translation strategy is to keep a width of the (n+1)th application window unchanged, translate the (n+1)th application window to the starting point direction, display the (n+1)th application window on the driving interface, translate the (n+2)th application window with a width equaling a difference between the second width and the first width to the starting point direction, and display the (n+2)th application window on the driving interface. The fourth determination sub-module is configured to determine, in cases that the first width is less than the second width and no (n+2)th application window exists, that the translation strategy is to keep the width of the (n+1)th application window unchanged, translate the (n+1)th application window to the starting point direction, and display the (n+1)th application window on the driving interface.

Optionally, the first determination sub-module includes a fifth determination sub-module. The fifth determination sub-module is configured to determine, in a case that the first width is equal to the second width, that the translation strategy is to keep a width of the (n+1)th application window unchanged, translate the (n+1)th application window to the starting point direction, and display the (n+1)th application window on the driving interface.

Optionally, the apparatus 200 further includes a third switch module. The third switch module is configured to switch the driving interface to a display interface previous to the driving interface in cases that n=1 and the to-be-removed window corresponding to the window removal operation is not located at a starting point of the window queue.

Optionally, the driving interface further includes a width adjustment control arranged between every two adjacent application windows. The width adjustment control is configured to adjust a width of the application window. The apparatus 200 may further include a reception module and a first adjustment module. The reception module is configured to receive a window width adjustment operation for the driving interface, where the window width adjustment operation is a first control operation for any one of the width adjustment controls. The first adjustment module is configured to adjust at least the width of the application window of the driving interface according to the first control operation and the window queue.

Optionally, n=3, widths of the n application windows are all $d/3$, and d is a width of the driving interface.

Optionally, the first adjustment module includes a first adjustment sub-module. The first adjustment sub-module is configured to stretch a width of a target application window to $2d/3$ in a case that the first control operation is to drag any one of the width adjustment controls away from the starting point direction. Where an nth application window in the driving interface is pushed to a display interface subsequent to the driving interface, and the target application window is an application window, close to the starting point direction, of application windows at two ends of the width adjustment control targeted by the first control operation.

Optionally, widths of the n application windows are all $d/3$, and d is a width of the driving interface.

In a case that a first application window in the driving interface is located at a starting point of the window queue, a width adjustment control close to the starting point direction is further configured to adjust a width of an application window, far away from the starting point direction, of application windows at two ends of the width adjustment control.

The first adjustment module may further include a second adjustment sub-module. The second adjustment sub-module is configured to adjust a width of a second application window in the driving interface to $2d/3$ in a case that the first control operation is to drag the width adjustment control close to the starting point direction to the starting point direction. Where the first application window is temporarily pushed out of the driving interface in the starting point direction.

Optionally, the apparatus 200 further includes a fifth display module and a second adjustment module. The fifth display module is configured to display, after the first application window is temporarily pushed out of the driving interface, the width adjustment control on a first vertical edge of the driving interface close to the starting point direction. The second adjustment module is configured to adjust, in response to receiving a second control operation for the width adjustment control on the first vertical edge, a width of a second application window of the driving interface to $d/3$, and translate the first application window temporarily pushed out of the driving interface back to the driving interface. Where the second control operation is to drag the width adjustment control on the first vertical edge away from the starting point direction.

Optionally, n=2, widths of the n application windows are $d/3$ or $2d/3$, an application window with a width of $2d/3$ in the driving interface is close to the starting point direction, and d is a width of the driving interface.

The first adjustment module may include a third adjustment sub-module. The third adjustment sub-module is configured to reduce, in cases that the first control operation is to drag the width adjustment control to the starting point direction and an (n+1)th application window exists, the width of the application window close to the starting point direction to $d/3$, translate an application window far away from the starting point direction and the (n+1)th application window with a width of $d/3$ in the driving interface to the starting point direction, and display the application window far away from the starting point direction and the (n+1)th application window on the driving interface.

Optionally, n=2, widths of the n application windows are $d/3$ and $2d/3$, an application window with a width of $d/3$ in the driving interface is close to the starting point direction, and d is a width of the driving interface.

The driving interface further includes a width adjustment control arranged on a second vertical edge, far away from the starting point direction, of the driving interface.

Optionally, the first adjustment module includes a fourth adjustment sub-module. The fourth adjustment sub-module is configured to stretch, in a case that the first control operation is to drag a width adjustment control close to the starting point direction away from the starting point direction, a width of a first application window in the driving interface to $2d/3$, and reduce a width of a second application window in the driving interface to $d/3$.

Optionally, the first adjustment module further includes a fifth adjustment sub-module and a sixth adjustment sub-module. The fifth adjustment sub-module is configured to reduce, in a case that the first control operation is to drag the width adjustment control far away from the starting point direction to the starting point direction, a width of an application window far away from the starting point direction to $d/3$. The sixth adjustment sub-module is configured to translate, in a case that an (n+1)th application window exists, the (n+1)th application window with a width of $d/3$ to the starting point direction, and display the (n+1)th application window on the driving interface.

Optionally, the driving interface includes n application windows, and the nth application window includes two or more different application interfaces.

A specific method for each module of the apparatus in the examples to execute an operation is described in detail in examples related to the methods, and will not be described in detail here.

The disclosure further provides a non-transitory computer-readable storage medium. The non-transitory computer-readable storage medium stores a computer program instruction. The program instruction when executed by a processor, causes the processor to implement the steps of the method for displaying a window provided in the disclosure.

The disclosure further provides an in-vehicle infotainment terminal. The in-vehicle infotainment terminal includes: a processor; and a memory configured to store a processor-executable instruction.

The processor is configured to execute the executable instruction in the memory, so as to implement steps of the method for displaying a window provided in the disclosure. Any of the modules described herein may be performed by a processor and/or memory.

Figure 21:
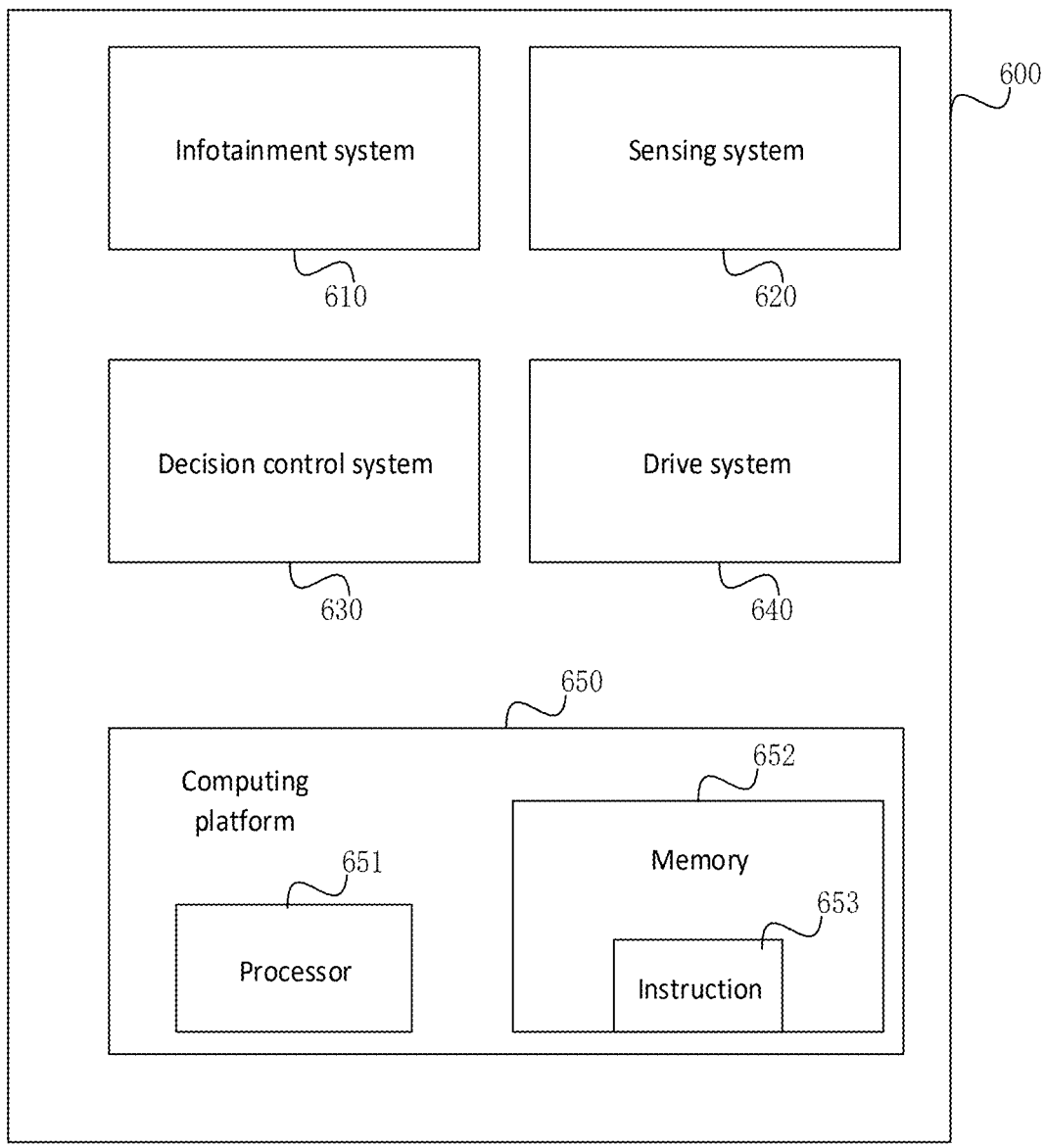
FIG. 21 is a schematic functional block diagram of a vehicle according to an example.

FIG. 21 is a block diagram of a vehicle 600 shown according to an example. For instance, the vehicle 600 may be a hybrid vehicle, or may be a non-hybrid vehicle, an electric vehicle, a fuel cell vehicle or other types of vehicles. The vehicle 600 may be an autonomous vehicle, a semi-autonomous vehicle or a non-autonomous vehicle.

With reference to FIG. 21, the vehicle 600 may include various subsystems, such as an infotainment system 610, a sensing system 620, a decision control system 630, a drive system 640 and a computing platform 650. The vehicle 600 may further include more or fewer subsystems (not shown). Each subsystem may include a plurality of components. In addition, interconnections between every subsystems and between every components of the vehicle 600 may be achieved in a wired or wireless manner.

In some examples, the infotainment system 610 may include a communication system, an entertainment system, a navigation system, etc.

The sensing system 620 may include one or more sensors. The sensors are configured to sense information of an environment surrounding the vehicle 600. For instance, the sensing system 620 may include a global positioning system (which may be GPS, Beidou System or other positioning systems), an inertial measurement unit (IMU), a laser radar, a millimeter wave radar, an ultrasonic radar and a photographing apparatus.

The decision control system 630 may include a computing system, a vehicle controller, a steering system, a throttle and a braking system.

The drive system 640 may include components that provide power for the vehicle 600 for motion. In an example, the drive system 640 may include an engine, an energy source, a drive system and wheels. The engine may be one or a combination of an internal combustion engine, an electric motor and an air compression engine. The engine can convert energy provided by an energy source into mechanical energy.

Some or all of the functions of the vehicle 600 are controlled by the computing platform 650. The computing platform 650 may include at least one processor 651 and the memory 652. The processor 651 may execute instructions 653 stored in the memory 652.

The processor 651 may be any conventional processor, such as a commercially available central processing unit (CPU). The processor may further include, for instance, a graphic process unit (GPU), a field programmable gate array (FPGA), a system on chip (SOC), an application specific integrated circuit (ASIC) or combinations of them.

The memory 652 may be implemented by any type of volatile or non-volatile storage devices or their combinations, such as a static random-access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk or an optical disk.

In addition to the instruction 653, the memory 652 may store data, such as a road map, route information, and a position, direction, speed, etc. of the vehicle. The data stored in the memory 652 may be used by the computing platform 650.

In an example of the disclosure, the processor 651 may execute an instruction 653, such that all or some steps of the above method for displaying a window are completed.

A person skilled in the art could easily conceive of other implementation solutions of the disclosure upon consideration of the description and the disclosure disclosed in the implementation. The disclosure is intended to cover any variations, uses or adaptive changes of the disclosure, which follow the general principles of the disclosure and include common general knowledge or customary technical means in the art that is not disclosed in the disclosure. The description and examples are merely regarded as exemplary. The true scope and spirit of the disclosure are indicated by the following claims.

It should be understood that the disclosure is not limited to a precise structure described herein and shown in accompanying drawings, and can have various modifications and changes without departing from the scope of the disclosure. The scope of the disclosure is only limited by the appended claims.

The invention claimed is:

1. A method for displaying a window, performed by an in-vehicle infotainment terminal, wherein a driving interface of an in-vehicle infotainment terminal comprises n application windows, n≥1, and in a case of n>1, n application windows are transversely arranged adjacent to each other, the method comprises:
   determining an existence condition of a vacant window position in the driving interface on a condition that a window addition instruction for a target window is received, wherein the target window is configured to display an application interface of a mobile terminal application or a mirror image of a mobile terminal; and
   adding the target window to the driving interface according to the existence condition,
   wherein a window queue is configured for the n application windows to be continuously arranged adjacent to each other, a state of the window queue is dynamically updated as a window layout of the driving interface changes, serial numbers of the application windows in the window queue increase in sequence in a direction opposite to a starting point direction, a serial number of an application window, closest to the starting point direction, of the n application windows is 1, and the starting point direction is a direction, close to a driver side, of the in-vehicle infotainment terminal, and
   wherein at least part of a region of the window queue overlaps the driving interface, so as to ensure that the application windows in the window queue are displayed in the driving interface.

2. The method according to claim 1, wherein
n=2, widths of the n application windows each are d/3 or 2d/3, and d is a width of the driving interface, and adding the target window to the driving interface according to the existence condition comprises:
   reducing, in a case that no vacant window position exists in the driving interface, a width of an application window with a width of 2d/3 in the driving interface to d/3, adding 1 to n, and adding the target window with a width of d/3 as an nth application window of the driving interface to the driving interface, and
   adding, in a case that a vacant window position exists in the driving interface, the target window to the vacant window position of the original driving interface.

3. The method according to claim 1, wherein
n=1, widths of the n application windows each are d, a width of the target window is d/3, and d is a width of the driving interface, and adding the target window to the driving interface according to the existence condition comprises:
   adjusting the width of the application window in the driving interface to 2d/3, adding 1 to n, and adding the target window with a width of d/3 as an nth application window of the driving interface to the driving interface.

4. The method according to claim 1, wherein
n=1, a width of the application window is d/3 or 2d/3, and d is a width of the driving interface, and adding the target window to the driving interface according to the existence condition comprises:
adding the target window to the vacant window position adjacent to the application window of the original driving interface, and executing n+1.

5. The method according to claim 1, wherein
n=3, widths of the n application windows are all d/3, and d is a width of the driving interface, and adding the target window to the driving interface according to the existence condition comprises:
adding the target window with a width of d/3 to a position at which an nth application window in the driving interface is located, wherein the original nth application window in the driving interface is pushed to a display interface subsequent to the driving interface.

6. The method according to claim 1, wherein adding the target window to the driving interface according to the existence condition comprises:
adjusting, in a case that a vacant window position exists in the driving interface, a width of the target window according to a width of the vacant window position and a width of the target window, and adding the target window to the vacant window position;
wherein adjusting the width of the target window according to the width of the vacant window position and the width of the target window, and adding the target window to the vacant window position comprise:
adding, in a case that the width of the target window is less than or equal to the width of the vacant window position, the target window to the vacant window position according to an original width, and
reducing, in a case that the width of the target window is greater than the width of the vacant window position, the width of the target window to the width of the vacant window position, and adding the target window to the vacant window position.

7. The method according to claim 1, further comprising:
generating a suspension selection control on a condition that it is detected that the mobile terminal application or the mirror image of the mobile terminal is suspended above the driving interface in a portrait state, wherein the suspension selection control is configured to indicate whether to add the target window to the driving interface; and
determining, on a condition that a trigger operation for the suspension selection control is received, that the window addition instruction is received.

8. The method according to claim 1, wherein the target window is the application interface of the mobile terminal application, the window addition instruction is transmitted by the mobile terminal, and the window addition instruction is transmitted to the in-vehicle infotainment terminal by the mobile terminal in a case that any one of the following conditions is satisfied:
an icon of the mobile terminal application in a mobile terminal interface is flipped to a direction of the driving interface is detected,
a thumbnail image of the mobile terminal application in a nearest task thumbnail image interface of the mobile terminal is flipped to the direction of the driving interface is detected,
it is detected that a target option in a menu bar corresponding to the icon of the mobile terminal application is selected, or
it is detected that a target option in a menu item corresponding to the thumbnail image of the mobile terminal application is selected,
wherein the target option denotes addition to the in-vehicle infotainment terminal,
wherein the method further comprises: satisfying, before the window addition instruction is transmitted by the mobile terminal, any one of the following conditions:
the in-vehicle infotainment terminal is connected to the mobile terminal is detected, or it is detected that the mobile terminal is located in a vehicle.

9. The method according to claim 1, wherein the target window is the application interface of the mobile terminal application; and the method further comprises:
displaying an icon of the mobile terminal application and an identifier of the mobile terminal in the target window in a case that it is detected that the in-vehicle infotainment terminal is not connected to the mobile terminal, and generating first reminding information configured to remind that the in-vehicle infotainment terminal is not connected to the mobile terminal.

10. The method according to claim 1, wherein the target window is the application interface of the mobile terminal application, and the method further comprises:
displaying, in a case that it is detected that the mobile terminal application is not installed, an icon of the mobile terminal application and an identifier of the mobile terminal in the target window; and
generating second reminding information configured to remind that the mobile terminal application is not installed.

11. The method according to claim 1, further comprising:
determining, on a condition that a window removal operation for the driving interface is received, a to-be-removed window from the driving interface according to the window removal operation;
removing a to-be-removed window n from the driving interface;
determining whether an (n+1)th application window exists;
translating, in a case that the (n+1)th application window exists, an application window having a serial number greater than a serial number of the to-be-removed window n in sequence in the window queue to the starting point direction; and
displaying the application window on the driving interface.

12. The method according to claim 11, wherein translating the application window having the serial number greater than the serial number of the to-be-removed window n in sequence in the window queue to the starting point direction, and displaying the application window on the driving interface comprise:
acquiring a first width of the (n+1)th application window and a second width of the to-be-removed window; and
determining a translation strategy according to a comparison result of the first width and the second width.

13. The method according to claim 12, wherein determining the translation strategy according to the comparison result of the first width and the second width comprises any one of the following:
determining, in a case that the first width is greater than the second width, that the translation strategy is to reduce a width of the (n+1)th application window to the second width, translate the (n+1)th application window to the starting point direction, and display the (n+1)th application window on the driving interface, determining, in cases that the first width is less than the second width and an (n+2)th application window exists, that the translation strategy is to keep a width of the (n+1)th application window unchanged, translate the (n+1)th application window to the starting point direction, display the (n+1)th application window on the driving interface, translate the (n+2)th application window with a width equaling a difference between the second width and the first width to the starting point direction, and display the (n+2)th application window on the driving interface, determining, in cases that the first width is less than the second width and no (n+2)th application window exists, that the translation strategy is to keep the width of the (n+1)th application window unchanged, translate the (n+1)th application window to the starting point direction, and display the (n+1)th application window on the driving interface, or determining, in a case that the first width is equal to the second width, that the translation strategy is to keep a width of the (n+1)th application window unchanged, translate the (n+1)th application window to the starting point direction, and display the (n+1)th application window on the driving interface.

14. The method according to claim 11, further comprising:
switching the driving interface to a display interface previous to the driving interface in cases that n=1 and the to-be-removed window corresponding to the window removal operation is not located at a starting point of the window queue.

15. The method according to claim 1, wherein the driving interface further comprises width adjustment controls separately arranged between every two adjacent application windows, and the width adjustment control is configured to adjust a width of the application window; and the method further comprises:
receiving a window width adjustment operation for the driving interface, wherein the window width adjustment operation is a first control operation for any one of the width adjustment controls; and
adjusting at least a width of the application window of the driving interface according to the first control operation and the window queue.

16. The method according to claim 15, wherein n=3, widths of the n application windows are all d/3, and d is a width of the driving interface; and adjusting at least the width of the application window of the driving interface according to the first control operation and the window queue comprises:
stretching a width of a target application window to 2d/3 in a case that the first control operation is to drag any one of the width adjustment controls away from the starting point direction, wherein an nth application window in the driving interface is pushed to a display interface subsequent to the driving interface, and the target application window is an application window, close to the starting point direction, of application windows at two ends of the width adjustment control targeted by the first control operation.

17. The method according to claim 15, wherein n=3, widths of the n application windows are all d/3, and d is a width of the driving interface;

in a case that a first application window in the driving interface is located at a starting point of the window queue, a width adjustment control close to the starting point direction is further configured to adjust a width of an application window, far away from the starting point direction, of application windows at two ends of the width adjustment control; and adjusting at least the width of the application window of the driving interface according to the first control operation and the window queue further comprises:

adjusting a width of a second application window in the driving interface to 2d/3 in a case that the first control operation is to drag the width adjustment control close to the starting point direction to the starting point direction, wherein the first application window is temporarily pushed out of the driving interface in the starting point direction, wherein the method further comprises:

displaying, after the first application window is temporarily pushed out of the driving interface, the width adjustment control on a first vertical edge, close to the starting point direction, of the driving interface; and adjusting, on a condition that a second control operation for the width adjustment control on the first vertical edge is received, the width of the second application window of the driving interface to d/3, and translating the first application window temporarily pushed out of the driving interface back to the driving interface, wherein the second control operation is to drag the width adjustment control on the first vertical edge away from the starting point direction.

18. The method according to claim 15, wherein n=2, widths of the n application windows are d/3 or 2d/3, an application window with a width of 2d/3 in the driving interface is close to the starting point direction, and d is a width of the driving interface; and adjusting at least the width of the application window of the driving interface according to the first control operation and the window queue comprises:

reducing, in cases that the first control operation is to drag the width adjustment control to the starting point direction and an (n+1)th application window exists, a width of an application window close to the starting point direction to d/3, translating an application window far away from the starting point direction and the (n+1)th application window with a width of d/3 in the driving interface to the starting point direction, and displaying the application window and the (n+1)th application window on the driving interface.

19. The method according to claim 15, wherein n=2, widths of the n application windows are d/3 and 2d/3, an application window with a width of d/3 in the driving interface is close to the starting point direction, and d is a width of the driving interface;

the driving interface further comprises a width adjustment control arranged on a second vertical edge, far away from the starting point direction, of the driving interface; and adjusting at least the width of the application window of the driving interface according to the first control operation and the window queue comprises:

stretching, in a case that the first control operation is to drag a width adjustment control close to the starting point direction away from the starting point direction, a width of a first application window in the driving interface to 2d/3, and reducing a width of a second application window in the driving interface to d/3;

wherein adjusting at least the width of the application window of the driving interface according to the first control operation and the window queue further comprises:

reducing, in a case that the first control operation is to drag the width adjustment control far away from the starting point direction to the starting point direction, a width of an application window far away from the starting point direction to d/3, and translating, in a case that an (n+1)th application window exists, the (n+1)th application window with a width of d/3 to the starting point direction, and displaying the (n+1)th application window on the driving interface.

20. An in-vehicle infotainment terminal, wherein a driving interface of an in-vehicle infotainment terminal comprises n application windows, n>1, and in a case of n>1, n application windows are transversely arranged adjacent to each other; the in-vehicle infotainment terminal comprising:

one or more processors; and a memory configured to store a processor-executable instruction; wherein the one or more processors are collectively configured to execute the processor-executable instruction in the memory, the processor-executable instruction cause the one or more processors to:

determine an existence condition of a vacant window position in the driving interface on a condition that a window addition instruction for a target window is received, wherein the target window is configured to display an application interface of a mobile terminal application or a mirror image of a mobile terminal; and add the target window to the driving interface according to the existence condition;

wherein a window queue is configured for the n application windows to be continuously arranged adjacent to each other, a state of the window queue is dynamically updated as a window layout of the driving interface changes, serial numbers of the application windows in the window queue increase in sequence in a direction opposite to a starting point direction, a serial number of an application window, closest to the starting point direction, of the n application windows is 1, and the starting point direction is a direction, close to a driver side, of the in-vehicle infotainment terminal; and at least part of a region of the window queue overlaps the driving interface, so as to ensure that the application windows in the window queue are displayed in the driving interface.

* * * * *